United States Patent
Hirai et al.

(10) Patent No.: US 9,344,712 B2
(45) Date of Patent: May 17, 2016

(54) IMAGE PROCESSING DEVICE, IMAGE PROCESSING METHOD, COMPUTER PROGRAM PRODUCT, AND IMAGE DISPLAY DEVICE

(71) Applicant: KABUSHIKI KAISHA TOSHIBA, Tokyo (JP)

(72) Inventors: Ryusuke Hirai, Tokyo (JP); Nao Mishima, Tokyo (JP); Kenichi Shimoyama, Tokyo (JP); Takeshi Mita, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 273 days.

(21) Appl. No.: 14/068,720

(22) Filed: Oct. 31, 2013

(65) Prior Publication Data
US 2014/0125781 A1      May 8, 2014

(30) Foreign Application Priority Data
Nov. 5, 2012   (JP) .................. 2012-243897

(51) Int. Cl.
| | |
|---|---|
| H04N 13/00 | (2006.01) |
| H04N 13/04 | (2006.01) |
| G06T 7/00 | (2006.01) |
| G06K 9/00 | (2006.01) |
| G06K 9/32 | (2006.01) |

(52) U.S. Cl.
CPC ........ *H04N 13/0468* (2013.01); *G06K 9/00228* (2013.01); *G06K 9/00993* (2013.01); *G06K 9/3233* (2013.01); *G06T 7/004* (2013.01); *G06T 2200/28* (2013.01); *G06T 2207/20021* (2013.01); *H04N 13/0404* (2013.01); *H04N 13/0409* (2013.01)

(58) Field of Classification Search
CPC ...................... H04N 13/0468; G06K 9/00228
USPC ............................................................. 348/51
See application file for complete search history.

(56) References Cited

U.S. PATENT DOCUMENTS

| | | | | |
|---|---|---|---|---|
| 5,990,898 A | * | 11/1999 | Urano | .................. G06T 15/00 345/426 |
| 2003/0128298 A1 | * | 7/2003 | Moon | .................. G06T 7/2033 348/578 |

(Continued)

FOREIGN PATENT DOCUMENTS

JP           4539729           7/2010

OTHER PUBLICATIONS

Viola et al.; "Rapid Object Detection Using a Boosted Cascade of Simple Features", Accepted Conference on Computer Vision and Pattern Recognition, pp. 1-9, (2001).

*Primary Examiner* — Jeffery Williams
(74) *Attorney, Agent, or Firm* — Finnegan, Henderson, Farabow, Garrett & Dunner, LLP

(57) ABSTRACT

According to an embodiment, an image processing device includes an obtaining unit, a first determining unit, and a detecting unit. The obtaining unit is configured to obtain an input image. The first determining unit is configured to determine a detection order that indicates an order of performing a detection operation for detecting whether an object is present with respect to partitioned areas into which the input image are divided, according to an existence probability that is set in advance for each of the partitioned areas and indicates a probability at which an object exists. The detecting unit is configured to perform, according to the detection order, the detection operation to detect whether the object is present in an area corresponding to a partitioned area subjected to the detection order in the input image.

9 Claims, 23 Drawing Sheets

(56) References Cited

U.S. PATENT DOCUMENTS

| | | | |
|---|---|---|---|
| 2004/0001139 A1* | 1/2004 | Kobayashi | G02B 27/2214 348/59 |
| 2005/0129311 A1* | 6/2005 | Haynes | G06K 9/00248 382/170 |
| 2012/0121126 A1* | 5/2012 | Hwang | G06K 9/00228 382/103 |

* cited by examiner

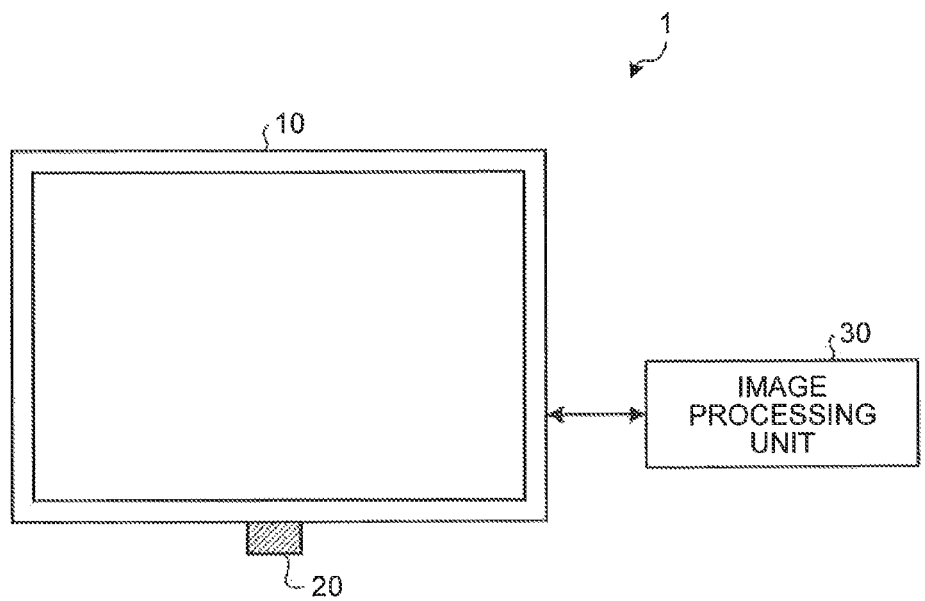
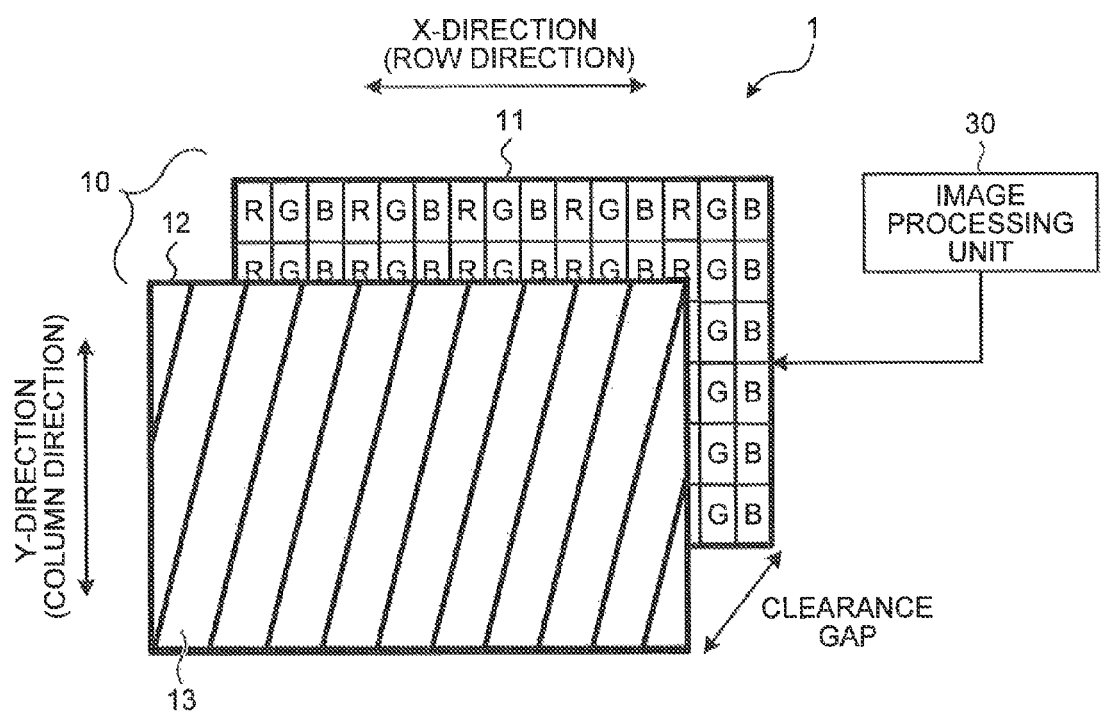

IMAGE PROCESSING DEVICE, IMAGE PROCESSING METHOD, COMPUTER PROGRAM PRODUCT, AND IMAGE DISPLAY DEVICE

CROSS-REFERENCE TO RELATED APPLICATIONS

This application is based upon and claims the benefit of priority from Japanese Patent Application No. 2012-243897, filed on Nov. 5, 2012; the entire contents of which are incorporated herein by reference.

FIELD

Embodiments described herein relate generally to an image processing device, an image processing method, a computer program product, and an image display device.

BACKGROUND

Typically, a technology is known in which an image captured by a camera (i.e., a captured image) is divided into a plurality of areas, and an object (a target object such as a face that appears in the captured image) is detected by scanning each area in a time-shared manner.

However, in the conventional technology, when an image is divided into a large number of areas, the time required for the detection of an object also increases. That makes it difficult to meet the restrictions on processing time.

BRIEF DESCRIPTION OF THE DRAWINGS

FIG. 1 is an outline drawing of an image display device according to a first embodiment;

FIG. 2 is a diagram illustrating a configuration example of a display unit according to the first embodiment;

DETAILED DESCRIPTION

Figure 3:
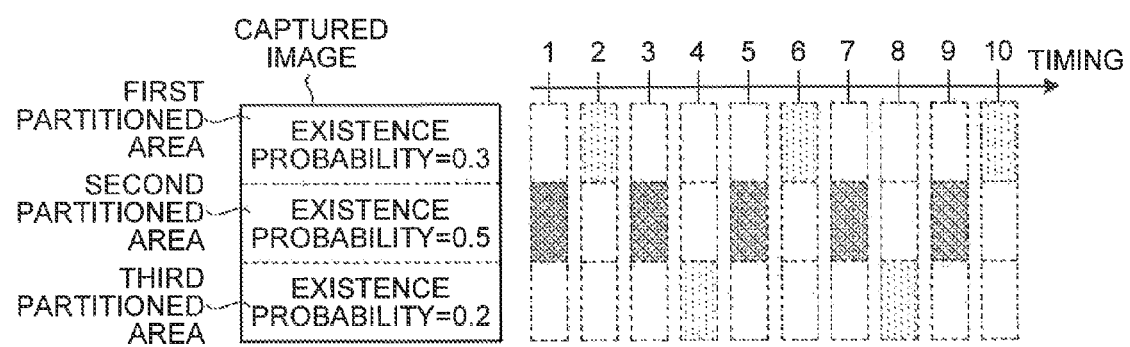
FIG. 3 is a schematic diagram for giving a brief overview of the first embodiment.

According to an embodiment, an image processing device includes an obtaining unit, a first determining unit, and a detecting unit. The obtaining unit is configured to obtain an input image. The first determining unit is configured to determine a detection order that indicates an order of performing a detection operation for detecting whether an object is present with respect to partitioned areas into which the input image are divided, according to an existence probability that is set in advance for each of the partitioned areas and indicates a probability at which an object exists. The detecting unit is configured to perform, according to the detection order, the detection operation to detect whether the object is present in an area corresponding to a partitioned area subjected to the detection order in the input image.

Exemplary embodiments of an image processing device, an image processing method, a computer program product, and an image display device according to the invention are described below in detail with reference to the accompanying drawings.

First Embodiment

An image processing device according to a first embodiment can be used in an image display device such as a television (TV) set, a personal computer (PC), a smartphone, or a digital photo frame that enables viewers to view stereoscopic images with the unaided eye. Herein, a stereoscopic image includes a plurality of parallax images having mutually different parallaxes. Meanwhile, in the embodiments, an image can either be a still image or a dynamic image.

FIG. 1 is an outline drawing of an image display device 1 according to the first embodiment. As illustrated in FIG. 1, the image display device 1 includes a display unit 10, an image capturing unit 20, and an image processing unit 30.

FIG. 2 is a diagram illustrating a configuration example of the display unit 10. As illustrated in FIG. 2, the display unit 10 includes a display element 11 and a light beam control element 12. If the display element 11 is viewed via the light beam control element 12, the viewer can view a stereoscopic image being displayed on the display unit 10. Herein, images having different parallaxes are displayed with respect to the left eye and the right eye of the viewer. With that, it becomes possible for the viewer to view a stereoscopic image.

The display element 11 is used to display stereoscopic images. In the display element 11, a plurality of sub-pixels having different colors (such as red (R), green (G), and blue (B) colors) is arranged in a matrix-like manner in the X-direction (the row direction) and the Y-direction (the column direction). In the example illustrated in FIG. 2, a single pixel is made of RGB sub-pixels. In the X-direction, the sub-pixels are repeatedly arranged in the order of red (R), green (G), and blue (B) colors. In the Y-direction, the sub-pixels of the same color component are arranged. As the display element 11, it is possible to use a direct-view-type two-dimensional display such as an organic electro luminescence (organic EL), a liquid crystal display (LCD), a plasma display panel (PDP), or a projection-type display. Moreover, the display element 11 can also have a configuration including a backlight. In the following explanation, the display element 11 is sometimes referred to as a panel.

The light beam control element 12 controls the direction of the light beam that is emitted from each sub-pixel of the display element 11. The light beam control element 12 has a plurality of linearly-extending optical apertures 13 arranged in the X-direction. In the example illustrated in FIG. 1, the light beam control element 12 is a lenticular sheet on which is arranged a plurality of cylindrical lenses (which function as the optical apertures 13 for emitting light beams). However, that is not the only possible case. Alternatively, for example, the light beam control element 12 can be a parallax barrier having a plurality of slits arranged thereon. Herein, a fixed distance (clearance gap) is maintained between the display element 11 and the light beam control element 12. Moreover, the light beam control element 12 is disposed in such a way that the extending direction of the optical apertures 13 has a predetermined tilt with respect to the Y-direction (the column direction) of the display element 11. As a result, there occurs a misalignment in the positions in the row direction of the optical apertures 13 and display pixels. Hence, for each different height, there is a different visible area (i.e., the area within which the viewer can view a stereoscopic image).

Returning to the explanation with reference to FIG. 1, the image capturing unit 20 captures images (i.e., performs imaging) of a predetermined area in the real space. In the following explanation, an image captured by the image capturing unit 20 is sometimes referred to as a captured image, and a target object such as the face of a human that appears in a captured image is sometimes referred to as an object. As the image capturing unit 20, it is possible to use various known imaging devices. In the first embodiment, the image capturing unit 20 is configured with a camera. Hence, in the following explanation, the image capturing unit 20 is sometimes referred to as a camera 20. Moreover, the installation position of the image capturing unit 20 can be set in an arbitrary manner. In the following explanation, it is assumed that the image display device 1 includes a single image capturing unit 20. However, that is not the only possible case. Alternatively, for example, the image display device 1 can include a plurality of image capturing units 20.

Given below is the explanation regarding the image processing unit 30. Prior to explaining the specific details of the image processing unit 30, a brief overview is given about the functions of the image processing unit 30. Herein, according to an existence probability (i.e., the probability at which an object is present) that is set in advance for each partitioned area obtained by dividing a captured image, the image processing unit 30 determines a detection order that indicates the order of performing detection operations with respect to the partitioned areas for detecting whether or not an object is present. Then, the image processing unit 30 performs the detection operations in the detection order for detecting whether or not the object is present in the partitioned areas. Meanwhile, the image processing unit 30 may be referred to as an "image processing device".

The brief overview is given with reference to FIG. 3. On the left-hand side in FIG. 3, it is illustrated that a captured area is divided into three partitioned areas. In the example illustrated in FIG. 3, the three partitioned areas are obtained by dividing the captured image in the vertical direction. The top partitioned area is referred to as a first partitioned area, the bottom partitioned area is referred to as a third partitioned area, and the middle partitioned area that is sandwiched between the first partitioned area and the third partitioned area is referred to as a second partitioned area. In the example illustrated in FIG. 3, it is assumed that the first partitioned area has the existence probability of 0.3, the second partitioned area has the existence probability of 0.5, and the third partitioned area has the existence probability of 0.2. In this case, the detection order for partitioned areas at each timing is illustrated on the right-hand side in FIG. 3. Herein, the horizontal axis represents the timing, and the vertical axis represents the vertical direction of the captured image. In the example illustrated in FIG. 3, since the captured image is not divided in the horizontal direction thereof, it is illustrated in a two-dimensional manner. On the right-hand side in FIG. 3, the partitioned area subjected to the detection operation at each timing from a timing 1 to a timing 10 is illustrated in halftone dots. Since the first partitioned area has the existence probability of 0.3; the first partitioned area is subjected to the detection operations thrice till the timing 10. In an identical manner, the number of times of performing the detection operations on the other partitioned areas varies according to the respective existence probabilities. From a timing 11 onward, the same detection order as the detection order from the timing 1 to the timing 10 is repeatedly applied in a cyclic manner. Thus, the timing 1 to the timing 10 represent a single cycle. Meanwhile, the method of determining the partitioned areas, each of which is subjected to the detection operations at particular timings according to the respective existence probabilities, is described later in detail.

The following explanation is regarding the timings that are used throughout this written description. In the case when a captured image is a moving image, the timings are discreetly expressed in the following manner: the start timing of obtaining the captured image as the timing 1, the input timing of the next captured image as the timing 2, and the like. With that, the amount of time between a timing t and a timing t+1 changes according to the frame rate of the camera (i.e., the image capturing unit 20) that is being used. For example, if the camera has the frame rate of 30 frames per second (fps), then the amount of time between the timing t and the timing t+11 becomes 1/30 seconds. Thus, the partitioned areas need to be determined in such a way that each detection operation is completed within that amount of time. Consider the case when the captured image is a still image. In that case, if the captured image is divided into N number of partitioned areas (N≥2) having the same size, then the timing 1 to the timing N represents a single cycle. The amount of time required to complete the detection operation with respect to each partitioned area is equal to the amount of time from the timing t to the timing t+1.

Meanwhile, the image processing unit 30 additionally has the following functions: a function (may be referred to as an "estimating unit") of estimating the three-dimensional position of the object in the real space based on object position information that contains the position and the size of the object detected as the result of a detection operation; a function (may be referred to as a "second determining unit") of determining the visible area, within which the viewer can view a stereoscopic image, that includes the three-dimensional position which has been estimated; and a function (may be referred to as a "display control unit") of controlling the display unit 10 in such a way that the visible area which has been determined is formed. However, for the sake of simplicity in the explanation, these functions are not explained in the first embodiment. Alternatively, the explanation is given with the focus on the function of detecting an object. The other functions are explained in the embodiments described later.

Figure 4:
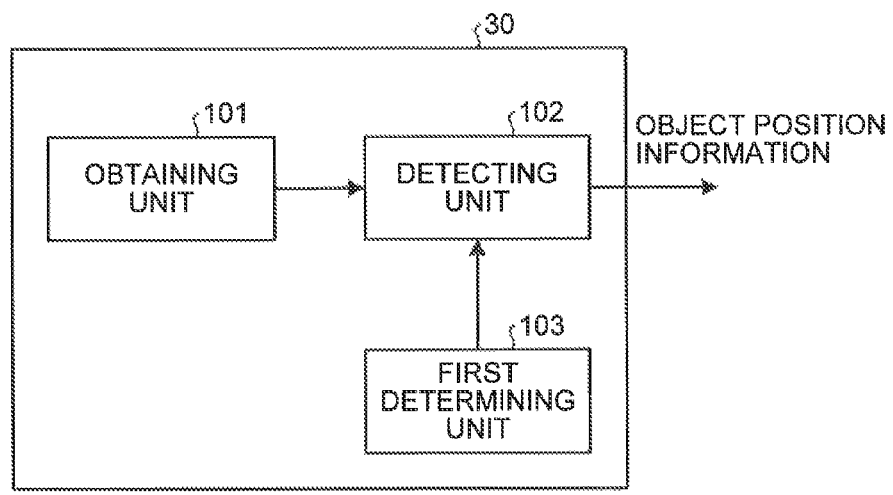
FIG. 4 is a functional block diagram illustrating a configuration example of an image processing unit according to the first embodiment.

Explained below are the details of the image processing unit 30. FIG. 4 is a functional block diagram illustrating a configuration example of only object-detection-related functions of the image processing unit 30 from among all functions of the image processing unit 30. As illustrated in FIG. 4, the image processing unit 30 includes an obtaining unit 101, a detecting unit 102, and a first determining unit 103. The obtaining unit 101 has the function of obtaining a captured image from the camera 20. Then, the obtaining unit 101 outputs the captured image to the detecting unit 102. Herein, the captured image can either be a still image or be a moving image. In the case of obtaining a moving image, the obtaining unit 101 also obtains the frame rate of the camera 20. In this example, although the captured image obtained from the camera 20 may be referred to as an "input image", it is not the only possible case.

The detecting unit 102 obtains the captured image from the obtaining unit 101 as well as obtains partitioned area information, in which some of the areas of the captured image are specified, from the first determining unit 103. Then, the detecting unit 102 performs detection operations to detect whether or not an object is present in any of those areas in the captured image obtained from the obtaining unit 101 which are specified in the partitioned area information obtained from the first determining unit 103. If an objected is detected in a specified area, the first determining unit 103 outputs the object position information that indicates the position and the size of the object in the captured image. As described later, the first determining unit 103 determines the detection order based on the existence probabilities set in advance for the partitioned areas that are obtained by dividing the captured image. Then, according to the detection order that has been determined, the first determining unit 103 sequentially outputs sets of partitioned area information, each of which indicates one of the partitioned areas, to the detecting unit 102. Subsequently, the detecting unit 102 performs a detection operation to detect, in the captured image obtained from the obtaining unit 101, whether or not the object is present in that area corresponding to the partitioned area specified in the partitioned area information that is obtained from the first determining unit 103. That is, it is possible to think that the detecting unit 102 has the function of performing detection operations according to the detection order determined by the first determining unit 103 and detecting whether or not the object is present in any of the areas corresponding to the partitioned areas of the captured image.

In the first embodiment, the detecting unit 102 scans a search window of a plurality of predetermined sizes over the captured image obtained by the obtaining unit 101; evaluates the degree of similarity between a prepared pattern of an image of the object and the pattern of the image within the search window; and accordingly determines whether or not the image within the search window represents the object. For example, when the target object is the face of a human being, it is possible to implement the search method disclosed in Paul Viola and Michael Jones, Rapid Object Detection using a Boosted Cascade of Simple Features, 2001 IEEE Computer Society Conference on Computer Vision and Pattern Recognition (CVPR 2001). In that search method, a number of rectangular features are obtained with respect to the image within the search window, and it is determined whether or not the face is a front face with the use of a strong classifier in which weak classifiers corresponding to the rectangular features are connected in series.

In the case of implementing the abovementioned search method in the image processing unit 30, the configuration can be such that each functional component (described later) that is involved includes a pattern classifier (not illustrated). A pattern classifier has a cascade structure in which a plurality of weak classifiers is connected in series, and points to an AdaBoost cascade classifier disclosed in Paul Viola and Michael Jones, Rapid Object Detection using a Boosted Cascade of Simple Features, 2001 IEEE Computer Society Conference on Computer Vision and Pattern Recognition (CVPR 2001).

More particularly, in a pattern classifier, the weak classifier at each level of the cascade determines whether the object is a face or a non-face, and carries forward only the image determined to include a face to the weak classifier at the next level. Then, the image that passes through the last weak classifier is determined to be the eventual face image.

The strong classifier constituting each level of the cascade has a plurality of weak classifiers connected in series. Each such weak classifier performs evaluation by referring to the rectangular features obtained with respect to the image within the search window.

Herein, if "x" represents the two-dimensional coordinate position vector in an image being searched, then the output of a particular weak classifier n regarding the position vector x is expressed using Expression (1) given below.

$$h_n(x) = \begin{cases} 1 & \text{if } p_n f_n(x) < p_n \theta_n \\ -1 & \text{otherwise} \end{cases} \quad (1)$$

In Expression (1), $h_n(x)$ represents the output of the weak classifier n; and $f_n(x)$ represents the judging function of the weak classifier n. Moreover, in Expression (1), $p_n$ represents either the number "1" or the number "−1" used in determining the inequality sign; and $\theta_n$ represents a predetermined threshold value with respect to each weak classifier n. For example, $\theta_n$ is set during the learning at the time of creating classifiers.

Regarding a strong classifier having N number of weak classifiers connected in series, the output is expressed using Equation (2) given below.

$$H(x) = \sum_{n=1}^{N} \alpha_n h_n(x) \quad (2)$$

In Equation (2), H(x) represents the output of a strong classifier that has N number of weak classifiers connected in series. Moreover, in Expression (2), $\alpha_n$ represents the weight of a predetermined weak classifier n; and $h_n$ represents the output of the weak classifier n expressed in Expression (1). For example, $\alpha_n$ is set during the learning at the time of creating classifiers.

In order to calculate likelihood l(x) indicating the likelihood that the image which has passed through the pattern classifier represents a face, Equation (3) given below is used.

$$l(x) = \frac{1}{1 + \exp(-aH(x))} \quad (3)$$

In Equation (3), "a" represents a constant number indicating the weight generated during the learning at the time of creating classifiers. Moreover, in Equation (3), H(x) represents the output of the strong classifier.

Meanwhile, the target object is not necessarily captured from only a certain direction. For example, it is also possible to think of a case when the target object is captured from a transverse direction or an oblique direction. In such a case, the image processing unit 30 is configured to include a pattern classifier for the purpose of detecting the profile. Moreover, in the image processing unit 30, each functional component involved in implementing the search method is assumed to be configured to include a pattern classifier that corresponds to each of one or more orientations of the target object.

The first determining unit 103 determines, according to the existence probabilities set in advance for a plurality of partitioned areas obtained by dividing a captured image, a detection order that indicates the order of performing detection operations with respect to the partitioned areas for detecting whether or not an object is present. Then, according to the detection order that has been determined, the first determining unit 103 sequentially outputs sets of partitioned area information, each of which indicates one of the partitioned areas, to the detecting unit 102.

Meanwhile, in the first embodiment, in a memory (not illustrated) is stored probability map data that indicates the existence probability set in advance with respect to each of a plurality of areas included in the image data that has the same size as the size of the captured image (herein, each area can be regarded to be corresponding to the position at which the object is detected (i.e., an object detection position)). The first determining unit 103 refers to the probability map data and determines a plurality of partitioned areas by performing grouping in descending order of areas having high existence probabilities. The detailed explanation thereof is given later. Meanwhile, the probability map data can be stored in an arbitrary storage destination. That is, the probability map data can either be stored in a memory (not illustrated) or in an external server device. Herein, the partitioned areas can be regarded to be corresponding, on a one-to-one basis, to a plurality of areas included in the captured image that is obtained by the obtaining unit 101.

Figure 5:
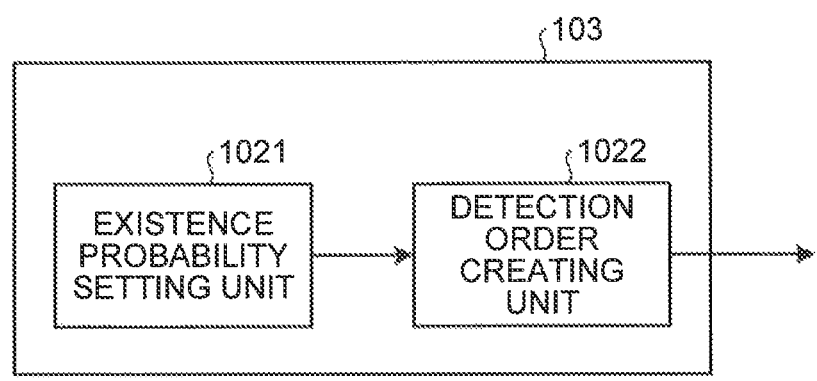
FIG. 5 is a block diagram illustrating a detailed functional configuration example of a first determining unit according to the first embodiment.

FIG. 5 is a block diagram illustrating a detailed functional configuration example of the first determining unit 103. As illustrated in FIG. 5, the first determining unit 103 includes an existence probability setting unit 1021 and a detection order creating unit 1022. The existence probability setting unit 1021 outputs, to the detection order creating unit 1022, the existence probability that is set in advance for each object detection position. In the first embodiment, the existence probability setting unit 1021 obtains the probability map data by accessing the memory (not illustrated); refers to the probability map data; and outputs, to the detection order creating unit 1022, the information indicating the existence probability that is set in advance for each object detection position.

Then, based on the existence probability that is set in advance for each object detection position, the detection order creating unit 1022 determines a plurality of partitioned areas and then determines a detection order based on the existence probability of each partitioned area that has been determined.

Figure 6:
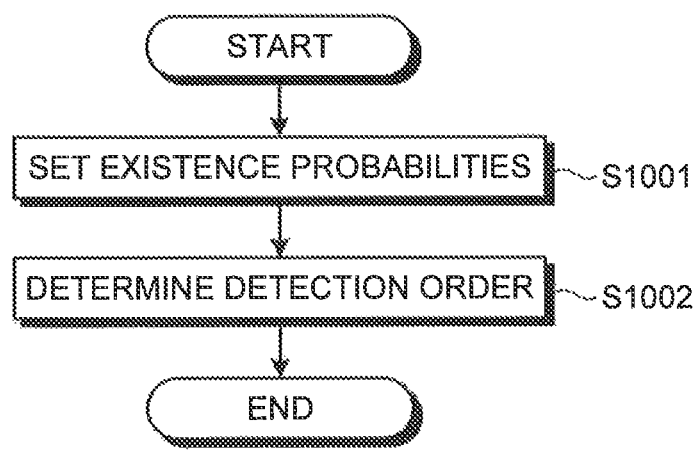
FIG. 6 is a flowchart for explaining exemplary operations performed by the first determining unit according to the first embodiment.

Explained below are the operations performed by the first determining unit 103 according to FIG. 6. Herein, FIG. 6 is a flowchart for explaining exemplary operations performed by the first determining unit 103. As illustrated in FIG. 6, the existence probability setting unit 1021 sets the existence probabilities (Step S1001). More particularly, the existence probability setting unit 1021 obtains the probability map data by accessing the memory (not illustrated); refers to the probability map data; and outputs, to the detection order creating unit 1022, the information indicating the existence probability that is set in advance for each object detection position.

Herein, if the top left point of the captured image is assumed to be the origin, if the x-axis is set in the horizontal right-hand direction and the y-axis is set in the vertical downward direction, and if a w-axis is assumed to be the size of the search window; then an existence probability can be expressed as a three-dimensional probability p(x, y, w). This, for example, is modeled using the three-dimensional normal distribution. Alternatively, for example, in the case when only a ceiling or the sky appears in the top portion of an image so that no object is likely to be present in that top portion and when it can be assumed that the image is not divided in the horizontal direction; the existence probabilities can be set using a one-dimensional probability p(y). Still alternatively, instead of the one-dimensional probability p(y), it is also possible make use of a one-dimensional probability p(x) or a one-dimensional probability p(z). Still alternatively, a two-dimensional probability using any two of x, y, and z can also be set. Still alternatively, it is also possible to make use of a contaminated normal distribution model.

Meanwhile, the three-dimensional coordinates (x, y, w) can also be regarded to be the information that indicates the scan position during a single scanning of the search window. The scanning of the search window is performed in a discreet manner. Thus, discreet existence probabilities can be used that include the existence probabilities defined only for those areas (object detection positions) which correspond to the combination of an integer in the range of 1≤x≤(a horizontal resolution $I_W$ of the input image) for the x-axis; an integer in the range of 1≤y≤(a vertical resolution $I_H$ of the input image) for the y-axis; and a plurality of predetermined window sizes (in the following explanation, the set of window sizes is represented by Ω) for the w-axis. In the following explanation, for the sake of simplicity in the explanation, such discreet positions are expressed with a vector i. That is, the existence relationship of the scan position during a single scanning of the search window is expressed using p(i). Moreover, the set of all scan positions of the search window is expressed using "I". Thus, in this example, the probability map data points to the data that indicates the existence probability set in advance for each of a plurality of scan positions included in a set I. Then, from the existence probability setting unit 1021, the detection order creating unit 1022 obtains the information indicating the existence probabilities set in advance for the scan positions included in the set I.

After the operation at Step S1001 is performed, the detection order creating unit 1022 determines a detection order, which indicates the order of performing detection operations with respect to the partitioned areas, based on the existence probability of each scan position (Step S1002).

Figure 7:
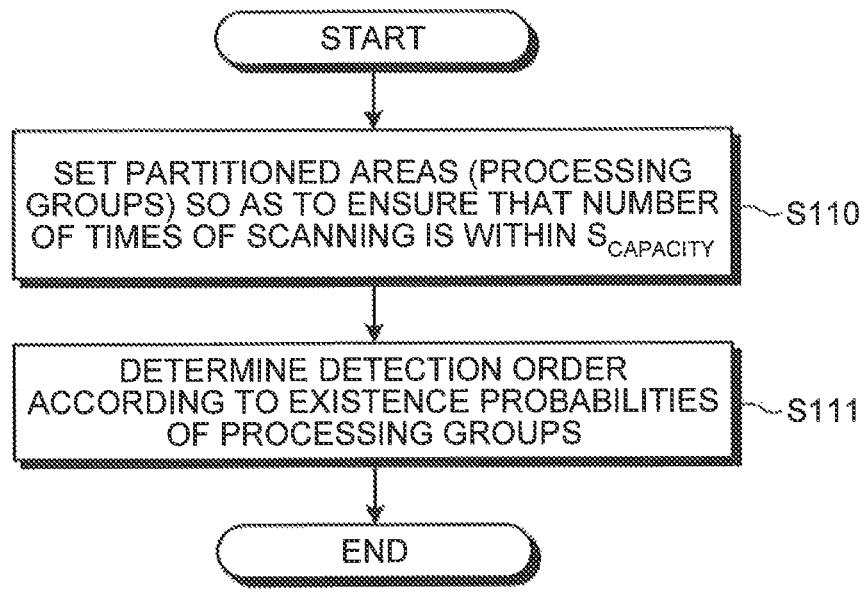
FIGS. 7 and 8 are flowcharts for explaining exemplary operations performed by a detection order creating unit according to the first embodiment.

Given below with reference to FIG. 7 is the detailed explanation of the operation performed at Step S1002. FIG. 7 is a flowchart for explaining the specific details of the operation performed at Step S1002 illustrated in FIG. 6.

Herein, "$S_{CAPACITY}$" represents the number of times for which scanning of the search window can be performed by the detecting unit 102 within a predetermined amount of time.

That is, the partitioned area information represents the information indicating the image areas during the number of times of scanning equal to $S_{CAPACITY}$ and the search window size.

As illustrated in FIG. 7, firstly, in order to ensure that the number of times of scanning is equal to $S_{CAPACITY}$, the detection order creating unit 1022 sets partitioned areas that are made of a plurality of scan positions (scan positions during a single scanning of the search window) expressed by a plurality of vectors i (hereinafter, those partitioned areas are referred to as a processing group) (Step S110). Herein, one or more processing groups are created. Hence, to the processing groups, indices k of natural numbers starting from 1 are assigned. A processing group k contains the following data: a set G(k) of the scan positions during a single scanning of the search window expressed by the vectors i; the number of elements (the number of scan positions) Cost(k) included in the set G(k); and the existence probability p(k) of the object in the processing group (i.e., the sum of the existence probabilities that correspond to the scan positions included in the processing group). When the processing group k is newly created; then G(k) is initialized to φ (an empty set), Cost(k) is initialized to CAPACITY, and p(k) is initialized to zero. Meanwhile, adding a vector i to the set G(k) is expressed as "G(k)←i".

Figure 8:
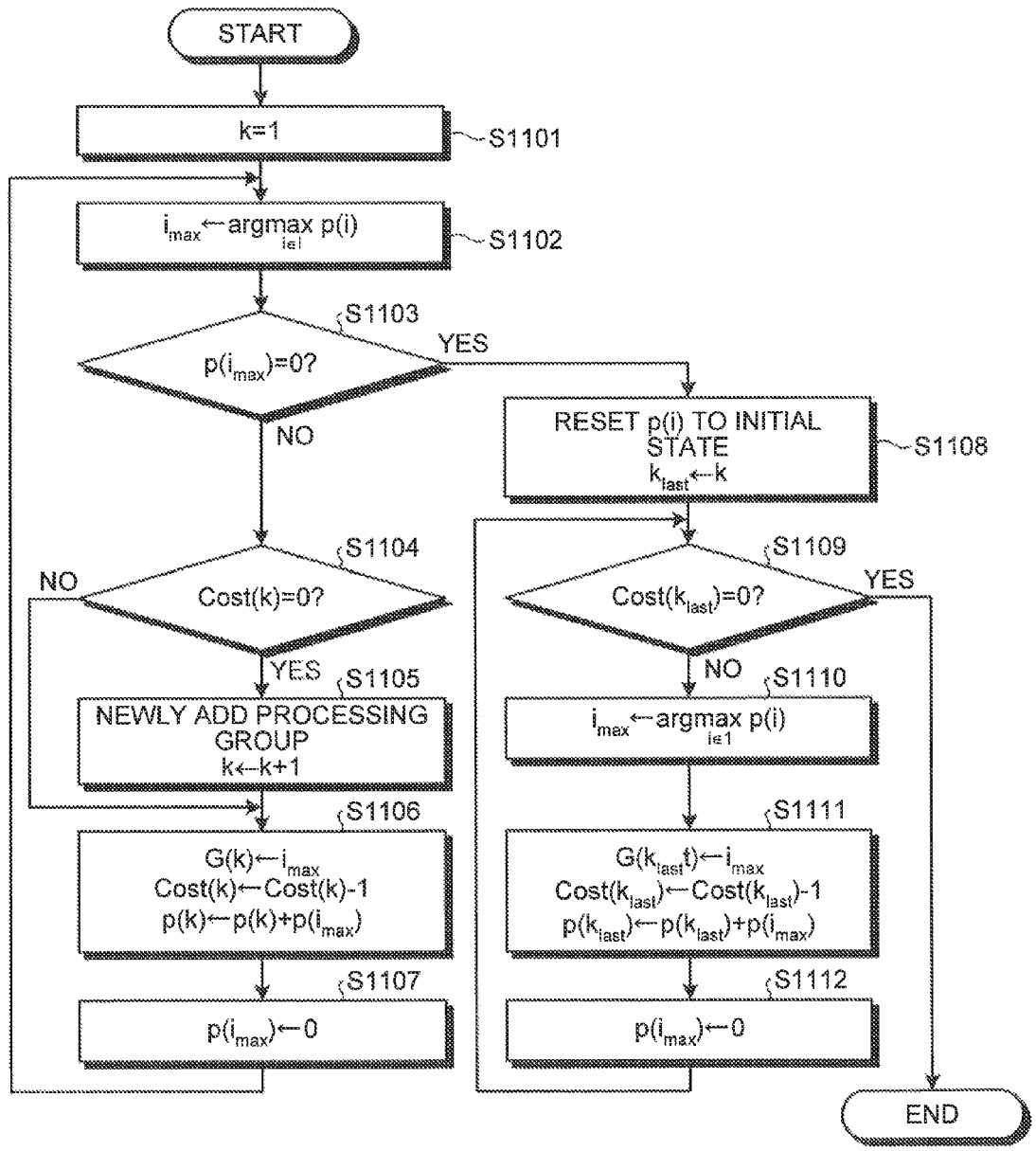

In the first embodiment, at Step S110, the detection order creating unit 1022 creates the processing groups in descending order of the existence probabilities of the elements belonging to the set I. Explained with reference to FIG. 8 is an example of the detailed aspects of the operation performed at Step S110. FIG. 8 is a flowchart for explaining an example of the detailed aspects of the operation performed at Step S110. As illustrated in FIG. 8, firstly, the detection order creating unit 1022 creates a single processing group (Step S1101). Herein, the explanation is given for a case in which the processing group identified by the index k=1 is created. Then, from among the scan positions included in the set I, the detection order creating unit 1022 obtains a scan position $i_{max}$ that has the highest existence probability (Step S1102).

Subsequently, the detection order creating unit 1022 determines whether or not an existence probability $p(i_{max})$ corresponding to the scan position $i_{max}$ is equal to zero (Step S1103). If it is determined that the existence probability $p(i_{max})$ is not equal to zero (No at Step S1103), then the detection order creating unit 1022 determines whether or not Cost(k) of the processing group k is equal to zero (Step S1104). If it is determined that Cost(k) is equal to zero (Yes at Step S1104), then the detection order creating unit 1022 newly adds a processing group and updates the index k to the index of the new processing group (Step S1105). On the other hand, if it is determined that Cost(k) is not equal to zero (No at Step S1104), then the operation at Step S1105 is skipped and the system control proceeds to Step S1106.

Then, the detection order creating unit 1022 adds the scan position $i_{max}$ to the set G(k) of the processing group k (Step S1106). Moreover, the detection order creating unit 1022 updates Cost(k) of the processing group k by decrementing the current value by one. Moreover, the detection order creating unit 1022 adds the existence probability $p(i_{max})$ of the scan position $i_{max}$ to the existence probability p(k) of the processing group k. Then, the detection order creating unit 1022 sets "0" in the existence probability $p(i_{max})$ of the scan position $i_{max}$ (Step S1107), and repeats the operations from Step S1102. As a result, the scan positions expressed by the vectors i exist in only one of the processing groups. By performing these operations, it can be ensured that all scan positions invariably belong to one of the processing groups. The operations mentioned above represent the operations in the left-hand portion of the flowchart illustrated in FIG. 8.

Meanwhile, when it is determined that the existence probability $p(i_{max})$ is equal to zero (Yes at Step S1103); if Cost($k_{last}$) of a processing group $k_{last}$ that was created in the last instance is not yet equal to zero, then it means that there is still leeway in the processing time of the processing group $k_{last}$. There, the detection order creating unit 1022 once resets the existence probabilities of the elements (the scan positions) of the set I to the initial state in which "0" is not yet set (i.e., to the state at the point of time of performing Step S1101) (Step S1108); and again adds the scan positions in descending order of the existence probabilities to a set G($k_{last}$) of the scan positions of the processing group $k_{last}$. More particularly, after the operation at Step S1108 is performed, the detection order creating unit 1022 determines whether or not Cost($k_{last}$) of the processing group $k_{last}$, which is created in the last instance, is equal to zero (Step S1109). If it is determined that Cost($k_{last}$) is equal to zero (Yes at Step S1109), then that marks the end of the operations. On the other hand, if it is determined that Cost($k_{last}$) is not equal to zero (No at Step S1109); then, from among the scan positions included in the set I, the detection order creating unit 1022 obtains the scan position $i_{max}$ that has the highest existence probability (Step S1110). Subsequently, the detection order creating unit 1022 adds the scan position $i_{max}$ to the set G($k_{last}$) of the processing group $k_{last}$; updates Cost($k_{last}$) of the processing group $k_{last}$ by decrementing the current value by one; and adds the existence probability $p(i_{max})$ of the scan position $i_{max}$ to the existence probability $p(k_{last})$ of the processing group $k_{last}$ (Step S1111). Then, the detection order creating unit 1022 sets "0" in the existence probability $p(i_{max})$ of the scan position $i_{max}$ (Step S1112), and repeats the operations from Step S1109.

Figure 9:
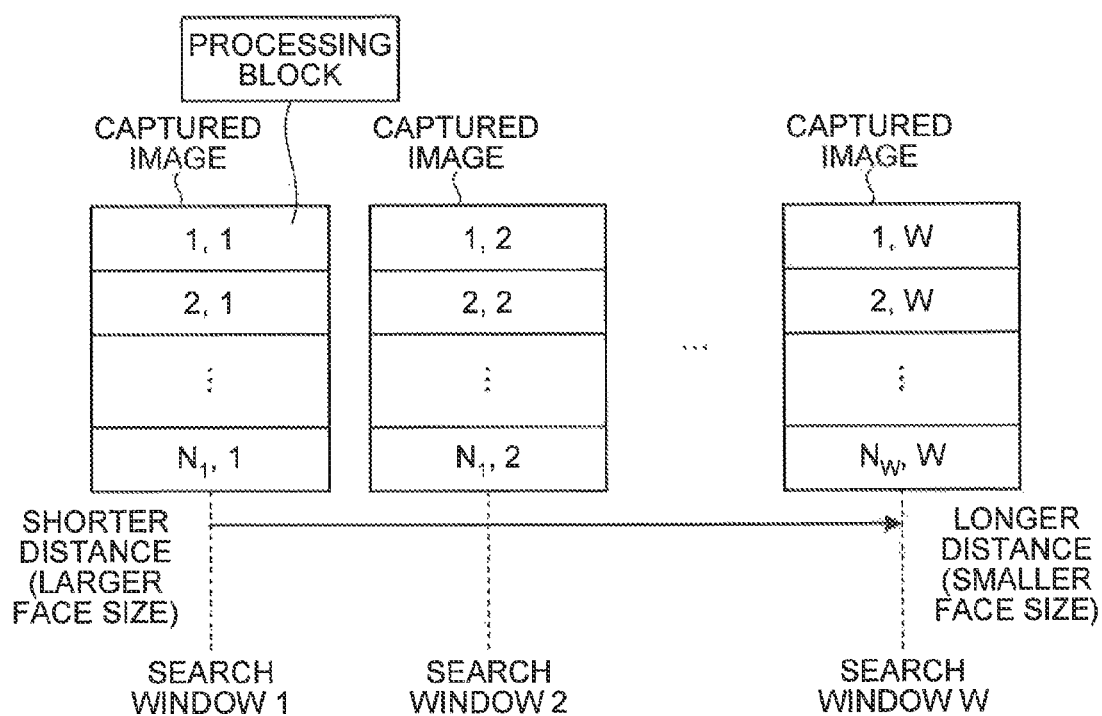
FIG. 9 is a schematic diagram for explaining processing blocks according to the first embodiment.

This was the explanation about the operations performed at Step S110 (see FIG. 7) in the case when the existence probabilities are expressed in a three-dimensional manner. However, it is also possible that the existence probabilities are expressed in a one-dimensional manner or a two-dimensional manner. In that case, the processing groups need not be formed for each scan position of the search window, but need to be formed in the units of blocks each of which is made of a plurality of scan positions. That is, the processing groups include one or more blocks. Such blocks are called processing blocks (see FIG. 9). Herein, to the processing blocks, indices b of natural numbers starting from 1 assigned (hereinafter, in the case of using the collective term "processing block", the explanation is given simply with reference to a processing block b). Consider the case when the existence probabilities are expressed in a one-dimensional manner. In that case, if, for example, y is fixed to y(b); then a set G(b) of the scan positions included in the processing block b can be expressed using Equation (4) given below.

$$G(b)=\{(x,y,w) | 1 \leq x \leq Iw, y=y(b), w \in \Omega\} \quad (4)$$

In Equation (4), y(b) does not represent a scan position, but represents a set of ranges that satisfy Expression (5) given below.

$$\frac{l_H}{n}(b-1) \le y(b) < \frac{l_H}{n}b \qquad (5)$$

In FIG. 5, "n" represents a natural number that the user can set. Once "n" is set, Cost(b) can be obtained using Equation (6) given below. At that time, "n" needs to be adjusted so as to ensure that $S_{CAPACITY}$/Cost(b)>1 is satisfied.

$$\text{Cost}(b)=\text{Size}(G(b)) \qquad (6)$$

Herein, a function "Size(A)" returns the number of elements included in a set A. In this case, P(b) can be obtained using Equation (7) given below.

$$p(b) = \sum_{y \in y(b)} p(y) \qquad (7)$$

The set of all processing blocks b that are created in the abovementioned manner is referred to as a set K.

Figure 10:
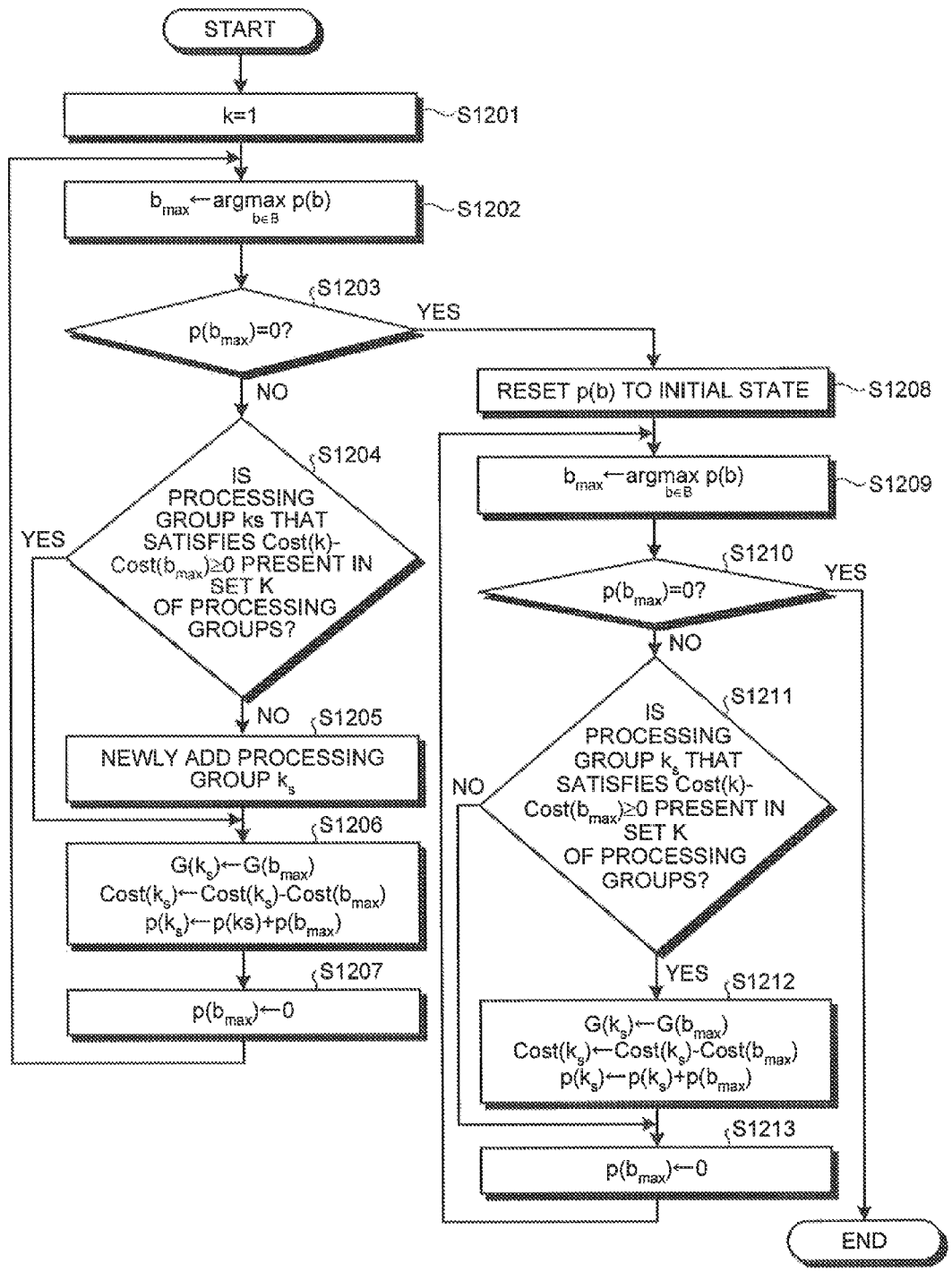
FIGS. 10 and 11 are flowcharts for explaining exemplary operations performed by the detection order creating unit according to the first embodiment.

Explained below with reference to FIG. 10 is an exemplary method of forming processing groups (partitioned areas) in the units of processing blocks. FIG. 10 is a flowchart for explaining the detailed aspects of the operation performed at Step S110 (see FIG. 7). As illustrated in FIG. 10, firstly, the detection order creating unit 1022 creates a single processing group (Step S1201). Herein, the operation details at Step S1201 are identical to the operation details at Step S1101 illustrated in FIG. 8.

Then, from among the processing blocks b included in the set K, the detection order creating unit 1022 obtains a processing block $b_{max}$ that has the highest existence probability (Step S1202). Subsequently, the detection order creating unit 1022 determines whether or not an existence probability $p(b_{max})$ corresponding to the processing block $b_{max}$ is equal to zero (Step S1203).

If it is determined that the existence probability $p(b_{max})$ is not equal to zero (No at Step S1203), then the detection order creating unit 1022 searches among the set K of the processing groups for a processing group $k_s$ that can include the processing of the processing block $b_{max}$ (Step S1204). More particularly, in the set K, the detection order creating unit 1022 searches for a processing group $k_s$ that satisfies Cost(k)−Cost$(b_{max})\ge 0$. If the processing group $k_s$ that can include the processing of the processing block $b_{max}$ is not present (No at Step S1204), then the detection order creating unit 1022 adds a new processing group $k_s$ to the set K (Step S1205). On the other hand, if the processing group $k_s$ that can include the processing of the processing block $b_{max}$ is present (Yes at Step S1204), then the operation at Step S1205 is skipped and the system control proceeds to Step S1206.

Then, the detection order creating unit 1022 adds a set $G(b_{max})$ of the scan positions included in the processing block $b_{max}$ to a set $G(k_s)$ of the processing group $k_s$ (Step S1206). Moreover, the detection order creating unit 1022 updates Cost($k_s$) of the processing group $k_s$ by decrementing the current value by Cost($b_{max}$). Furthermore, the detection order creating unit 1022 adds the existence probability $p(b_{max})$ of the processing block $b_{max}$ to the existence probability $p(k_s)$ of the processing group $k_s$. Then, the detection order creating unit 1022 sets "0" in the existence probability $p(b_{max})$ of the processing block $b_{max}$ (Step S1207), and repeats the operations from Step S1202.

Meanwhile, when it is determined that the existence probability $p(b_{max})$ is equal to zero (Yes at Step S1203), then it indicates the fact that each processing block b included in the set K is added as an element of the set of scanning positions of one of the processing blocks. At that time, it is found whether or not there is still leeway in the processing time of each of a plurality of processing groups included in the set K. Firstly, the detection order creating unit 1022 resets the existence probability of each element of the set K to the state at the point of time of performing Step S1201 (Step S1208). Then, in an identical manner to Step S1202, the detection order creating unit 1022 obtains the processing block $b_{max}$ that has the highest existence probability (Step S1209). Subsequently, in an identical manner to Step S1202, the detection order creating unit 1022 determines whether or not the existence probability $p(b_{max})$ corresponding to the processing block $b_{max}$ is equal to zero (Step S1210).

If it is determined that the existence probability $p(b_{max})$ is equal to zero (Yes at Step S1210), then that marks the end of the operations. On the other hand, if it is determined that the existence probability $p(b_{max})$ is not equal to zero (No at Step S1210); then, in an identical manner to Step S1204, the detection order creating unit 1022 searches for the processing group $k_s$ that can include the processing of the processing block $b_{max}$ (Step S1211).

If the processing group $k_s$ is present that can include the processing of the processing block $b_{max}$ (Yes at Step S1211); then, in an identical manner to Step S1206, the detection order creating unit 1022 adds the set $G(b_{max})$ of the scan positions included in the processing block $b_{max}$ to the set $G(k_s)$ of the processing group $k_s$. Moreover, the detection order creating unit 1022 updates Cost($k_s$) of the processing group $k_s$ by decrementing the current value by Cost($b_{max}$). Furthermore, the detection order creating unit 1022 adds the existence probability $p(b_{max})$ of the processing block $b_{max}$ to the existence probability $p(k_s)$ of the processing group $k_s$ (Step S1212). Then, in an identical manner to Step S1207, the detection order creating unit 1022 sets "0" in the existence probability $p(b_{max})$ of the processing block $b_{max}$ (Step S1213), and repeats the operations from Step S1209.

Meanwhile, if the processing group $k_s$ is not present that can include the processing of the processing block $b_{max}$ (No at Step S1211); then, in an identical manner to Step S1207, the detection order creating unit 1022 sets "0" in the existence probability $p(b_{max})$ of the processing block $b_{max}$ (Step S1213), and repeats the operations from Step S1209.

This was the explanation about the case when the existence probabilities are expressed in a one-dimensional manner. Consider the case when the existence probabilities are expressed in a two-dimensional manner. In that case, if, for example, x is fixed to x(b) and y is fixed to y(b); then the set G(b) of the scan positions included in the processing block b can be expressed using Equation (8) given below.

$$G(b)=\{(x,y,w)|x=x(b),y=y(b),w\in\Omega\} \qquad (8)$$

At that time, Cost(b) can be expressed using Equation (9) given below.

$$\text{Cost}(b)=\text{Size}(G(b)) \qquad (9)$$

Moreover, P(b) can be obtained using Equation (10) given below.

$$p(b)=p(x(b),y(b)) \qquad (10)$$

Regarding x(b) and y(b) too, it is possible to have ranges in an identical manner to the case in which the probability existences are expressed in a one-dimensional manner. By setting the processing block b in this way, it becomes possible to form the processing groups according to the flowchart illustrated in FIG. 10.

In the example described above, it is desirable to form the processing groups in such a way that, in a single processing group, the same processing groups b are not duplicated (i.e., a plurality of processing groups b is not present). Given above was the explanation of the detailed aspects of the operation performed at Step S110 illustrated in FIG. 7.

Returning to the explanation with reference to FIG. 7, after the operation at Step S110 is performed, the detection order creating unit 1022 determines a detection order, which indicates the order of performing detection operations with respect to the processing groups, based on the existence probabilities of the processing groups (Step S111). In the first embodiment, according to the existence probability distribution of the processing groups and random numbers, the detection order creating unit 1022 determines the processing group k to be subjected to the detection operation at the timing t; and outputs, as the partitioned area information, the information indicating the set G(k) of the scan positions included in that processing group k (i.e., the information used to specify the processing group k). Herein, the detection order creating unit 1022 determines the detection order in such a way that the processing groups having higher existence probabilities are subjected to the detection operation on priority. More particularly, the detection order is determined in such a way that the processing groups having higher existence probabilities are subjected to the detection operation before the processing groups having lower existence probabilities, as well as the processing groups having higher existence probabilities are subjected to the detection operation on a more frequent basis. In this case, the detection positions of the partitioned areas are not cyclic as illustrated in FIG. 3. Moreover, at each timing, the detection area at that timing is determined using random numbers.

Figure 11:
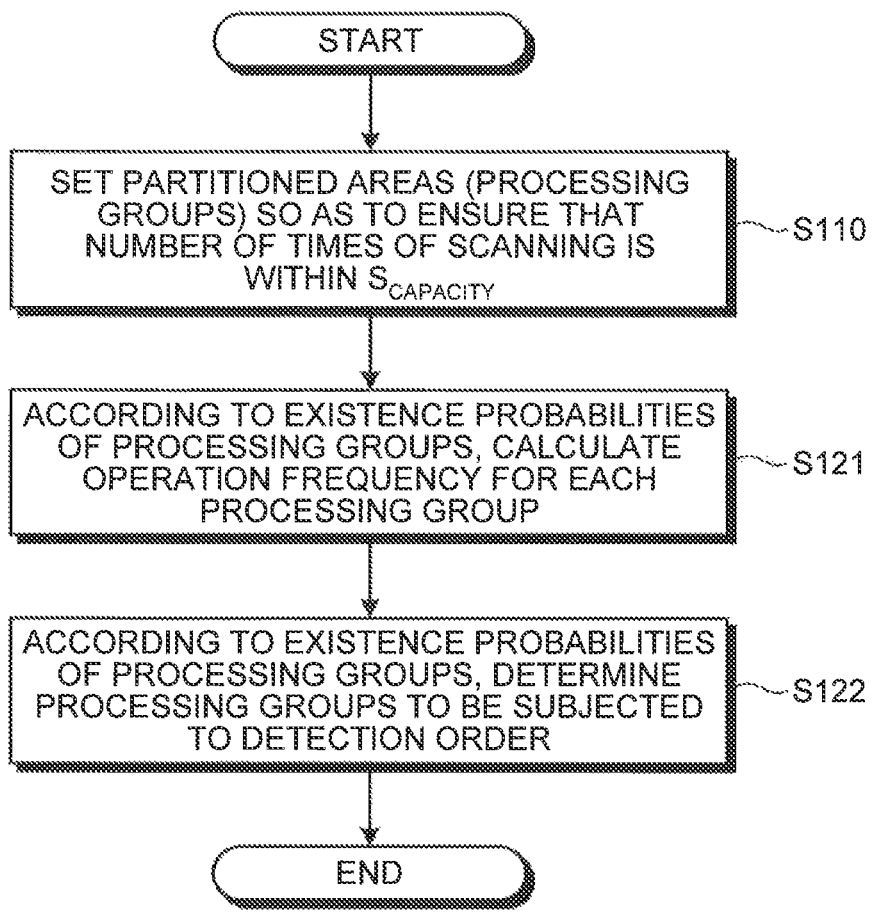

Meanwhile, the detection order creating unit 1022 can determine the detection order (Step S1002 illustrated in FIG. 6) also according to a flowchart illustrated in FIG. 11. The operation at Step S110 illustrated in FIG. 11 is identical to the operation at Step S110 illustrated in FIG. 7. Hence, the detailed explanation is not repeated. Then, the detection order creating unit 1022 calculates an operation frequency histogram h(k) according to the existence probabilities p(k) of a plurality of processing groups included in the set K (Step S121). The operation frequency histogram h(k) can be obtained using Equation (11) given below.

$$h(k) = \text{round}\left(\frac{p(k)}{\min_{k \in K} p(k)}\right) \quad (11)$$

Herein, a function "round (x)" returns an integer obtained by the rounding off of x. In Expression 11, the smallest value of the denominator is limited to the smallest value other than zero. Regarding the operation frequency h(k) obtained using Expression 11; higher the existence probability of a range group, higher is the integer value. The smallest value of the operation frequency h(k) is one. That is, it is ensured that each processing group is subjected to the detection operation at least once.

Subsequently, according to the operation frequency h(k) calculated for each processing group, the detection order creating unit 1022 determines the processing groups up to a timing $0 \le t \le T_{all}$ (Step S122). That is, the detection order creating unit 1022 determines the processing group to be subjected to the detection operation at each timing from the timing t=0 to the timing t=$T_{all}$ (i.e., determines the detection order). Herein, "$T_{all}$" represents the total processing time (cycle), and can be obtained using Equation (12) given below.

$$T_{all} = \sum_{k \in K} h(k) \quad (12)$$

Figure 12:
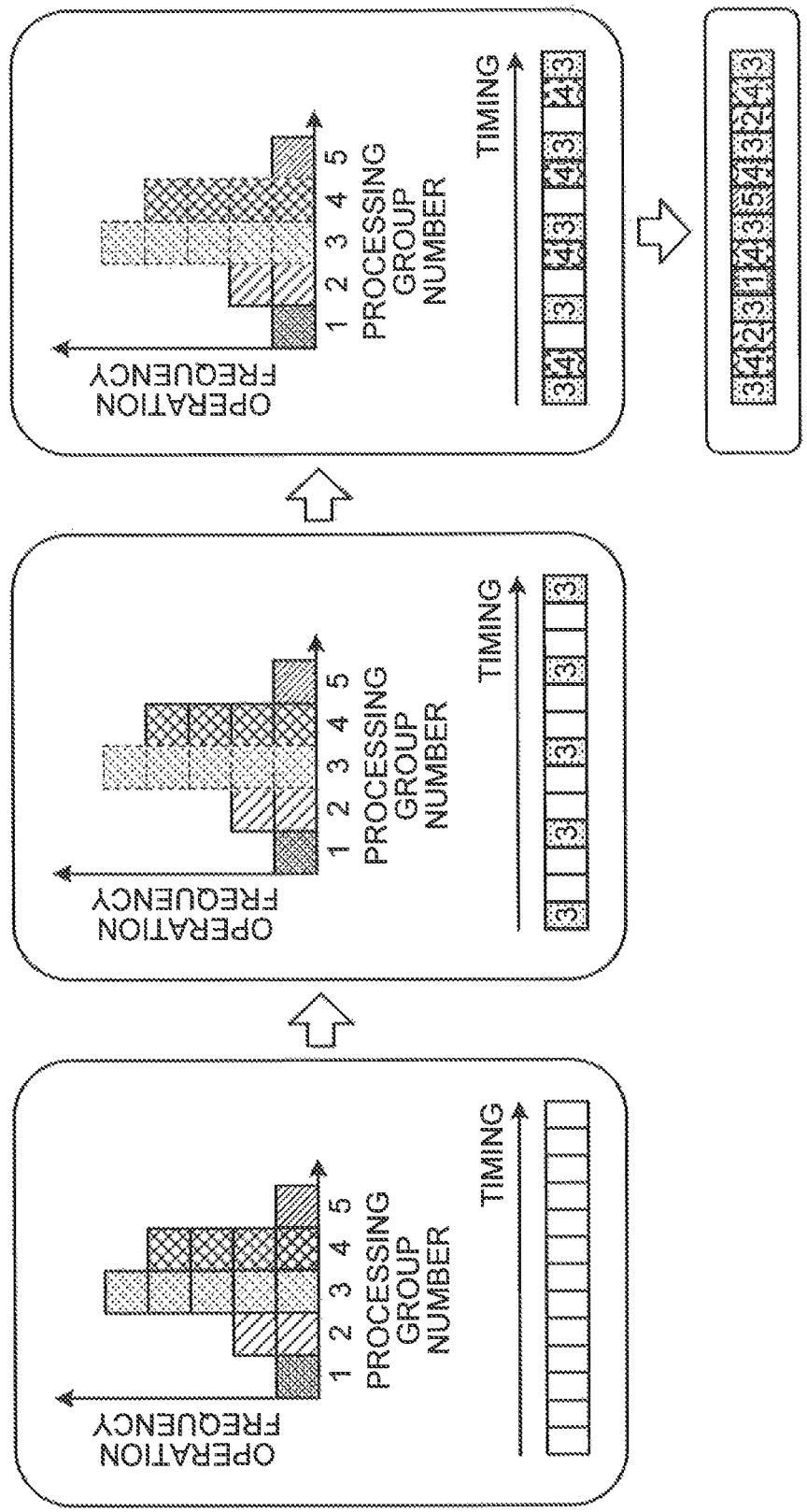
FIG. 12 is a diagram that schematically illustrates an exemplary method of determining a detection order according to the first embodiment.

A brief overview of the operation performed at Step S122 is given with reference to FIG. 12. In the example illustrated in FIG. 12, it is assumed that there are five processing groups, namely, a processing group 1 to a processing group 5. Moreover, it is assumed that the processing group 1 has the operation frequency h(1)=1; the processing group 2 has the operation frequency h(2)=2; the processing group 3 has the operation frequency h(3)=5; the processing group 4 has the operation frequency h(4)=4; and the processing group 5 has the operation frequency h(5)=1. Thus, "$T_{all}$" becomes equal to 13. Then, a schedule (the detection order) is created by filling each of the 13 cells illustrated in the lower portion in FIG. 12 with the index k (the processing group number) of the corresponding processing group. Herein, a cell is called a schedule slot.

Figure 13:
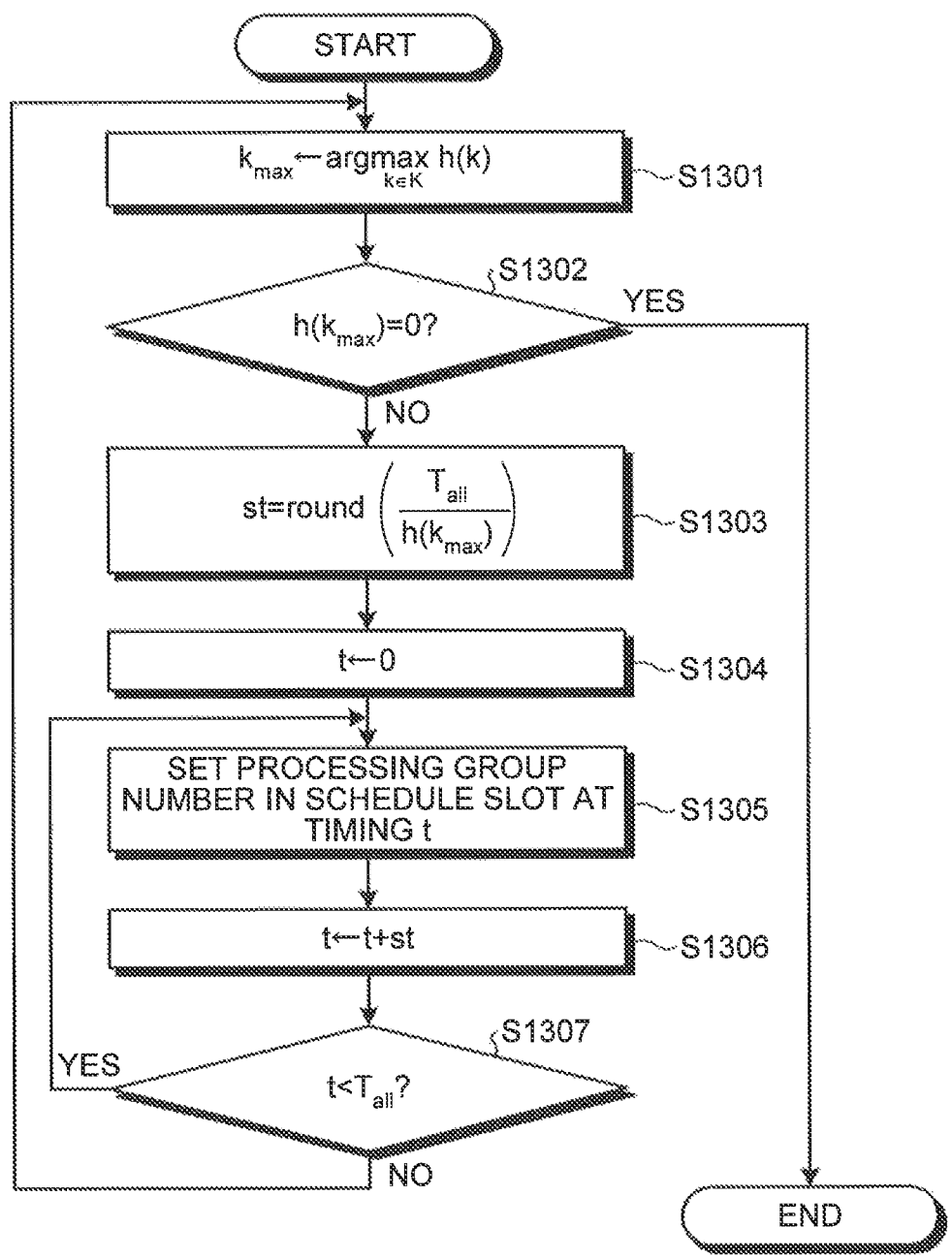
FIGS. 13 to 17 are flowcharts for explaining exemplary operations performed by the detection order creating unit according to the first embodiment.

Explained below with reference to FIG. 13 are the details of the operation performed at Step S122 described above. FIG. 13 is a flowchart for explaining an example of the detailed aspects of the operation performed at Step S122. As illustrated in FIG. 13, firstly, the detection order creating unit 1022 obtains a processing group $k_{max}$ that has the highest operation frequency in the set K (Step S1301). Then, the detection order creating unit 1022 determines whether or not the operation frequency $h(k_{max})$ of the processing group $k_{max}$ is equal to zero (Step S1302). If it is determined that the operation frequency $h(k_{max})$ is equal to zero (Yes at Step S1302), then that marks the end of the operations. On the other hand, if it is determined that the operation frequency $h(k_{max})$ is not equal to zero (No at Step S1302), then the detection order creating unit 1022 obtains $st(k_{max})$ that represents the interval for putting the processing group $k_{max}$ in a schedule slot (Step S1303). Herein, st(k) corresponding to the processing group k can be obtained using Equation (13) given below.

$$st(k) = \text{round}\left(\frac{T_{all}}{h(k)}\right) \quad (13)$$

Subsequently, the detection order creating unit 1022 initializes "t", which represents the position (the timing) of a schedule slot, to "0" (Step S1304). Then, the detection order creating unit 1022 sets the processing group number (i.e., the index k of the processing group) in the schedule slot at the timing t (Step S1305).

Figure 14:
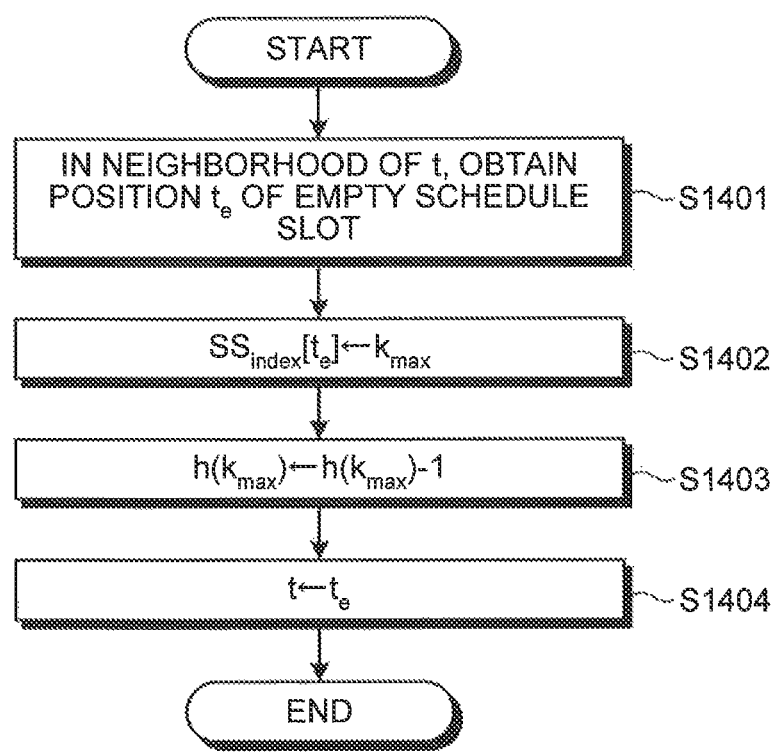

The operation performed at Step S1305 is explained in detail with reference to FIG. 14. Herein, FIG. 14 is a flowchart for explaining an example of the detailed aspects of the operation performed at Step S1305. As illustrated in FIG. 14, the detection order creating unit 1022 obtains a position (a timing) $t_e$ of such a schedule slot in the neighborhood of the timing t which does not have a processing group number set therein (which is empty) (Step S1401).

Figure 15:
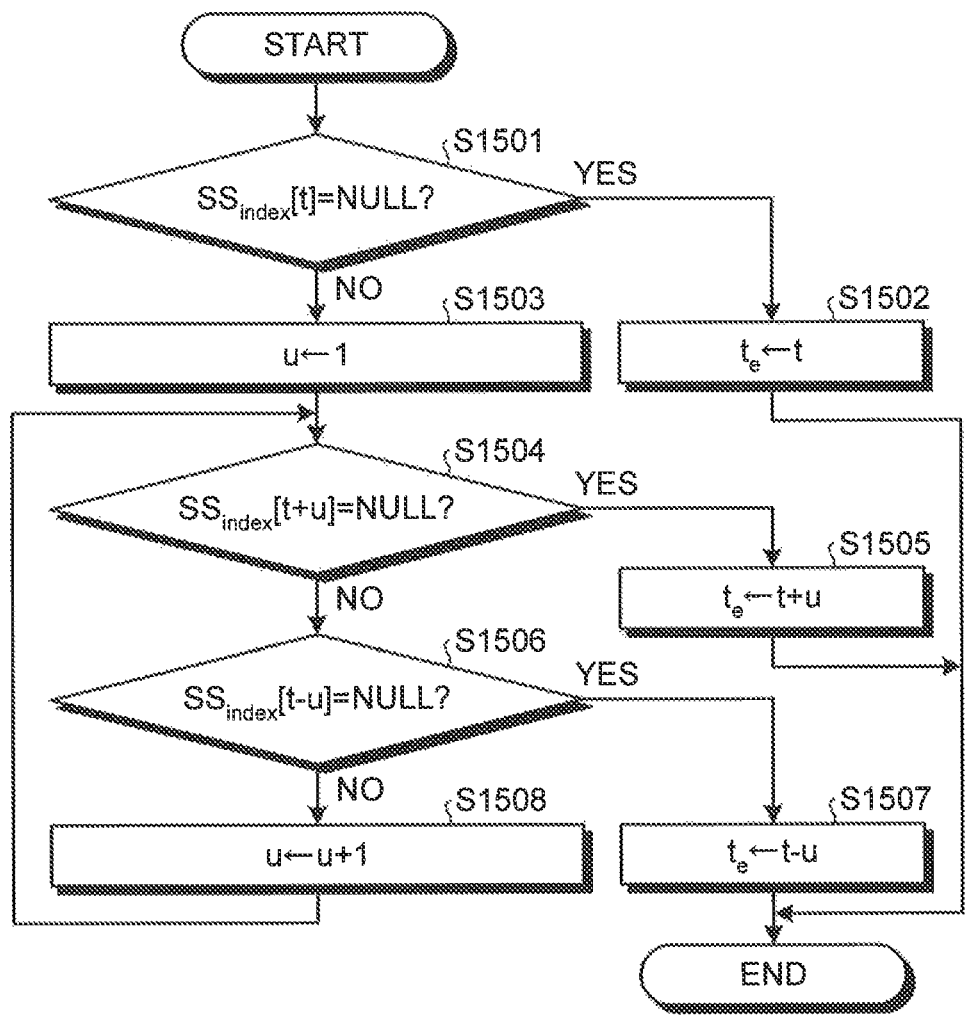

FIG. 15 is a flowchart for explaining an example of the detailed aspects of the operation performed at Step S1401. Thus, the detailed aspects of the operation performed at Step S1401 are explained below with reference to FIG. 15. Firstly, the detection order creating unit 1022 determines whether or not a schedule slot SSindex[t] at the timing t is equal to NULL (Step S1501). That is, the detection order creating unit 1022 determines whether or not a processing group number has been set in the schedule slot SSindex[t] at the timing t.

If it is determined that the schedule slot SSindex[t] at the timing t is equal to NULL (Yes at Step S1501), that is, if it is determined that a processing group number is not yet set in the schedule slot SSindex[t] at the timing t; then the detection order creating unit 1022 sets "te=t" (Step S1502). That marks the end of the operations.

On the other hand, if it is determined that the schedule slot SSindex[t] at the timing t is not equal to NULL (No at Step S1501), that is, if it is determined that a processing group number has already been set in the schedule slot SSindex[t] at the timing t; then the detection order creating unit 1022 sets an offset u of the timing t to "1" (Step S1503). Then, the detection order creating unit 1022 determines whether or not a schedule slot SSindex[t+u] at the timing t+u, which is obtained by moving in the positive direction from the timing t by an amount equal to the offset, is equal to NULL (Step S1504). If it is determined that the schedule slot SSindex[t+u] at the timing t+u is equal to NULL (Yes at Step S1504), then the detection order creating unit 1022 sets "te=t+u" (Step S1505). That marks the end of the operations.

On the other hand, if it is determined that the schedule slot SSindex[t+u] at the timing t+u is not equal to NULL (No at Step S1504), then the detection order creating unit 1022 determines whether or not a schedule slot SSindex[t−u] at the timing t−u, which is obtained by moving in the negative direction from the timing t by an amount equal to the offset, is equal to NULL (Step S1506). If it is determined that the schedule slot SSindex[t−u] at the timing t−u is equal to NULL (Yes at Step S1506), then the detection order creating unit 1022 sets "te=t−u" (Step S1507). That marks the end of the operations. On the other hand, if it is determined that the schedule slot SSindex[t−u] at the timing t−u is not equal to NULL (No at Step S1506), then the detection order creating unit 1022 increments the offset u by one (Step S1508) and repeats the operations starting from Step S1504. This was the explanation about the detailed aspects of the operation performed at Step S1401 illustrated in FIG. 14.

Returning to the explanation with reference to FIG. 14, after the operation at Step S1401 is performed; the detection order creating unit 1022 sets, in the schedule slot SSindex[te] at the timing $t_e$ obtained at Step S1401, an index number $k_{max}$ (the processing group number) of the processing group $k_{max}$ that has the highest operation frequency (Step S1402). Then, the detection order creating unit 1022 decrements the operation frequency $h(k_{max})$ of the processing group $k_{max}$ by one (Step S1403). Subsequently, the detection order creating unit 1022 substitutes the timing t for the timing $t_e$ (Step S1404). That marks the end of the operations performed at Step S1305. This was the explanation about the detailed aspects of the operation performed at Step S1305 illustrated in FIG. 13.

Returning to the explanation with reference to FIG. 13, after the operation at Step S1305 is performed, the detection order creating unit 1022 adds $st(k_{max})$ to the timing t (that has been substituted for the timing te) (Step S1306). Then, the detection order creating unit 1022 determines whether or not the timing t is smaller than the total processing time $T_{all}$ (Step S1307). If it is determined that the timing t is smaller than the total processing time $T_{all}$ (Yes at Step S1307), then the detection order creating unit 1022 repeats the operations starting from Step S1305. On the other hand, if it is determined that the timing t is greater than the total processing time $T_{all}$ (No at Step S1307), then the detection order creating unit 1022 repeats the operations starting from Step S1301. In this way, the detection order creating unit 1022 creates the detection order (schedule).

Meanwhile, although not mentioned in the flowcharts described above, it is desirable to have a confirmation function as follows. During the creation of the schedule, there are times when a calculation error in rounding off leads to a case when all schedule slots are not filled or a case when all schedule slots are filled and a particular processing group number cannot be input. In the former case, empty schedule slots are deleted. In the latter case, the total processing time is corrected to add an empty schedule slot, and the empty schedule slot is then filled. With the use of a schedule created in this manner, it becomes possible to determine the partitioned area information up to the timing $T_{all}$. Regarding the timings prior to the timing $T_{all}$, the schedule is repeatedly set. Herein, the operations performed till the creation of the schedule are called detection order setup.

Figure 16:
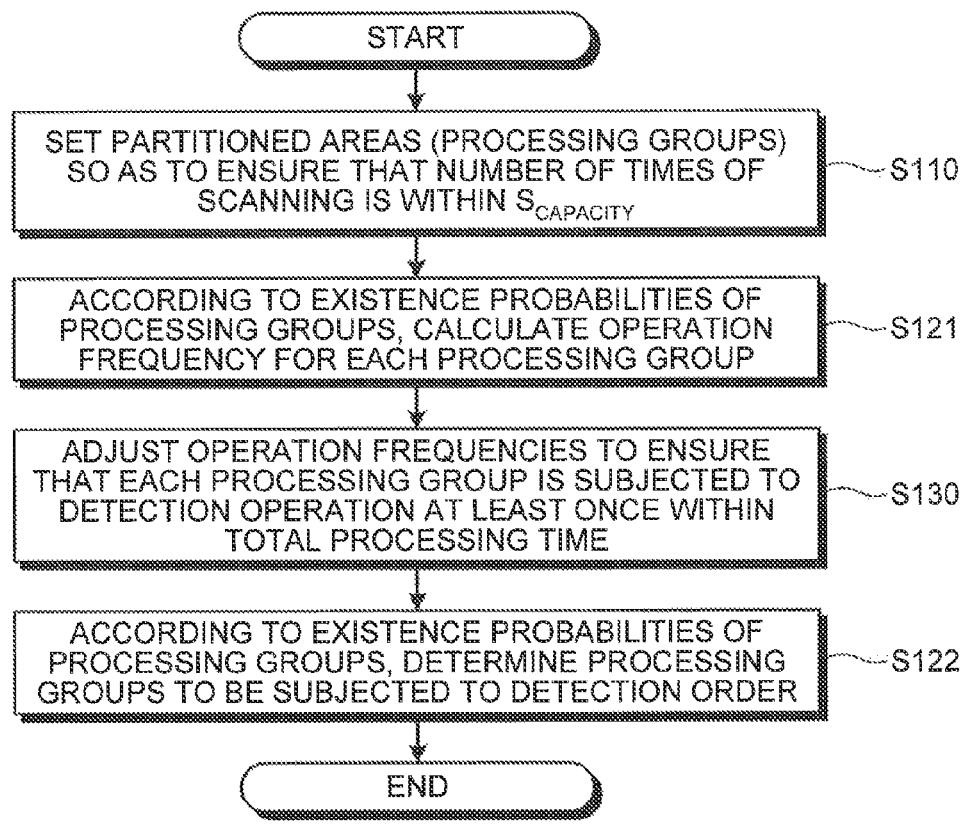

Meanwhile, the detection order creating unit 1022 can determine the detection order (Step S1002 illustrated in FIG. 6) also according to a flowchart illustrated in FIG. 16. As compared to the flowchart illustrated in FIG. 11, the flowchart illustrated in FIG. 16 differs in the way of performing the operation at Step S130. Hence, the explanation herein is given only regarding the details of the operation at Step S130.

At Step S130, the detection order creating unit 1022 adjusts the operation frequencies in such a way that each processing group is subjected to the detection operation at least once within the total processing time $T_{all}$. In the first embodiment, the detection order creating unit 1022 performs adjustment so that the total processing time $T_{all}$ becomes equal to a time $T_{max}$ that is set by the user. For example, consider the following case: there is a large bias in the existence probabilities of the processing groups; two processing groups A and B have a ratio of existence probabilities p(A):p(B) equal to 999:1; and the object in a captured image is present in the area corresponding to the processing group B. Under those conditions, in the worst case, it becomes necessary to wait for the timing 1000 till the object gets detected.

In that regard, the detection order creating unit 1022 performs adjustment in such a way that the total processing time $T_{all}$ becomes equal to the time $T_{max}$ that is set by the user, as well as adjusts the operation frequencies in such a way that each processing group within the set time $T_{max}$ is subjected to the detection operation at least once. As a result, for example, even in the case when the two processing groups A and B have a ratio of existence probabilities p(A):p(B) equal to 999:1; the processing group B is subjected to the detection operation at least once. Thus, if the object in a captured image is present in the area corresponding to the processing group B; that object can be reliably detected within the set time $T_{max}$. In essence, the detection order creating unit 1022 can determine the detection order in such a way that each processing group is subjected to the detection operation at least once within a predetermined period of time.

Figure 17:
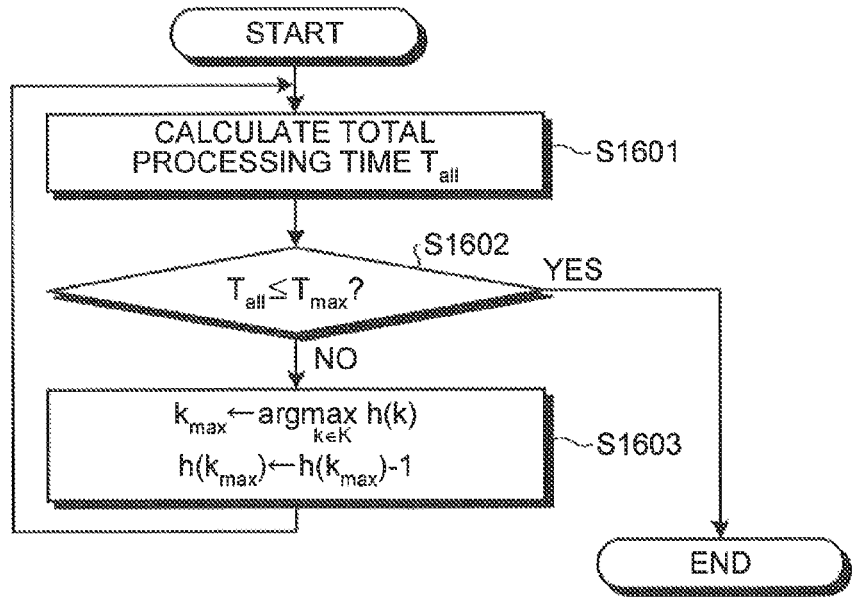

FIG. 17 is a flowchart for explaining an example of the detailed aspects of the operation performed at Step S130 illustrated in FIG. 16. As illustrated in FIG. 17, the detection order creating unit 1022 obtains the total processing time $T_{all}$ using Expression 12 given above (Step S1601). Then, the detection order creating unit 1022 determines whether or not the total processing time $T_{all}$ is smaller than the time $T_{max}$ that the user has set (Step S1602). If it is determined that the total processing time $T_{all}$ is smaller than the time $T_{max}$ (Yes at Step S1602), then that marks the end of the operations. On the other hand, if it is determined that the total processing time $T_{all}$ is greater than the time $T_{max}$ (No at Step S1602), then the detection order creating unit 1022 obtains the processing group $k_{max}$ having the highest operation frequency from among the processing groups included in the set K, and decrements the operation frequency $h(k_{max})$ of the processing group $k_{max}$ (Step S1603); and repeats the operations starting from Step S1601.

Figure 18:
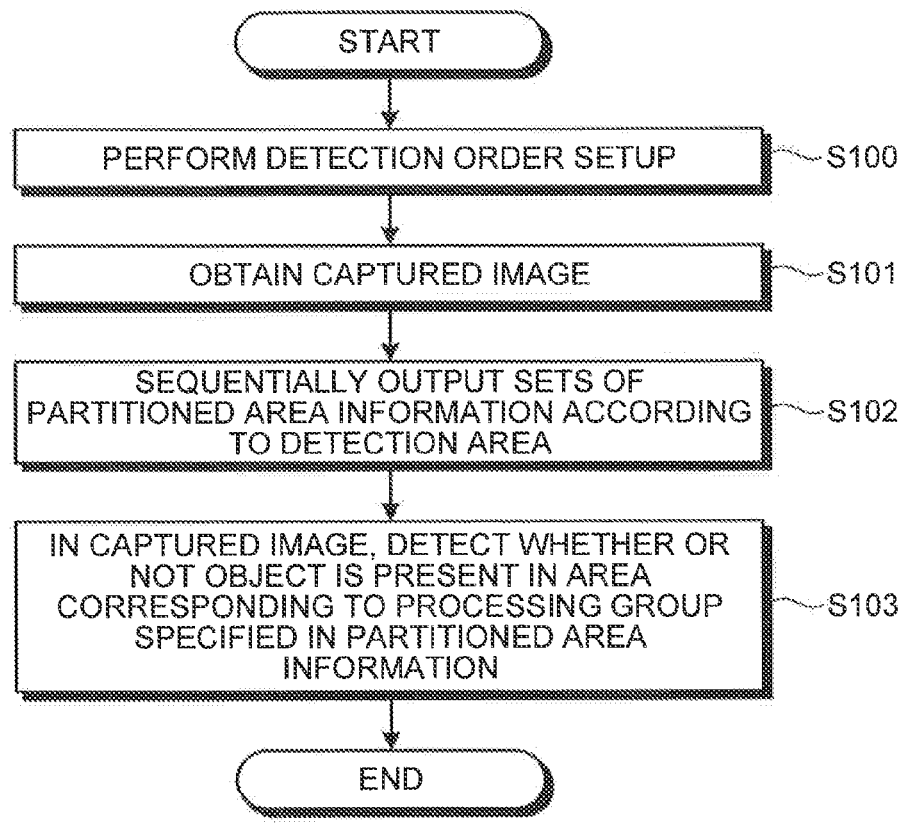
FIG. 18 is a flowchart for explaining an example of the operations performed by the image processing unit according to the first embodiment.

Explained below with reference to FIG. 18 are the operations performed by the image processing unit 30 according to the first embodiment. FIG. 18 is a flowchart for explaining an example of the operations performed by the image processing unit 30. As illustrated in FIG. 18, firstly, the first determining unit 103 performs detection order setup (Step S100). Then, the obtaining unit 101 obtains a captured image (Step S101). Subsequently, according to the detection order that has been determined, the first determining unit 103 sequentially outputs the partitioned area information to the detecting unit 102 (Step S102). Then, the detecting unit 102 performs a detection operation to detect whether or not, in the captured image obtained by the obtaining unit 101, an object is present in the area corresponding to the processing group specified in the partitioned area information (Step S103).

As described above, according to the first embodiment, a detection order is determined in such a way that, from among a plurality of processing groups obtained by dividing an input image (in this example, a captured image), the processing groups having higher existence probabilities set in advance are subjected to a detection operation on priority. As a result, it becomes possible to reduce the expected waiting time till the object is detected.

Moreover, in the first embodiment, a plurality of processing groups (partitioned areas) is formed by grouping areas (scan positions or processing blocks b) in descending order of existence probabilities. However, that is not the only possible case, and the processing blocks can be formed by implementing any arbitrary method. For example, instead of taking into account the existence probabilities, the image data can be divided in a matrix-like manner and each of a plurality of partitioned areas obtained as a result of the division can be regarded as a processing group.

Second Embodiment

Given below is the explanation of a second embodiment. As compared to the first embodiment, the second embodiment differs in the way that the existence probability of such a processing group (such a partitioned area) is increased which corresponds to an area in the input image from which an object is detected as a result of a detection operation. The specific aspects are explained below. Meanwhile, regarding the points that are identical to the first embodiment, the explanation is not repeated.

Figure 19:
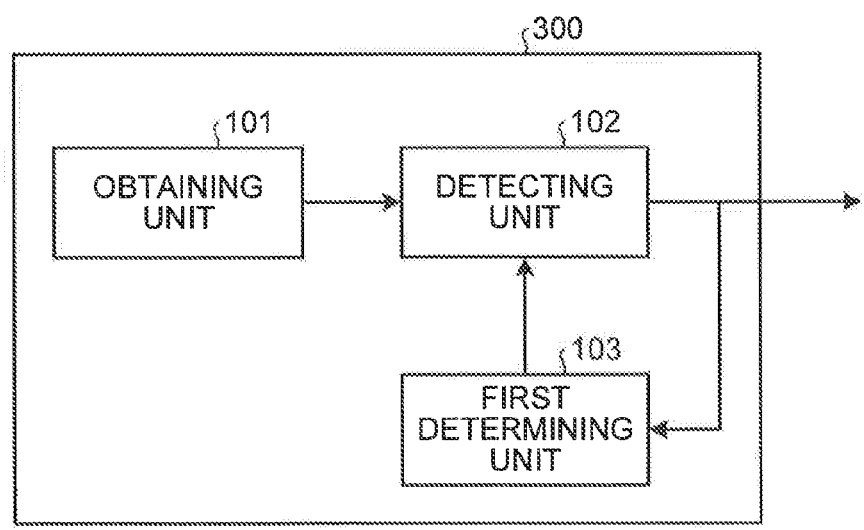
FIG. 19 is a functional block diagram illustrating a functional configuration example of an image processing unit according to a second embodiment.

FIG. 19 is a functional block diagram illustrating a functional configuration example of an image processing unit 300 according to the second embodiment. Herein, as compared to the image processing unit 30 according to the first embodiment, the only difference in the image processing unit 300 is a first determining unit 201. Hence, the explanation is given with the focus on the functions of the first determining unit 201.

Figure 20:
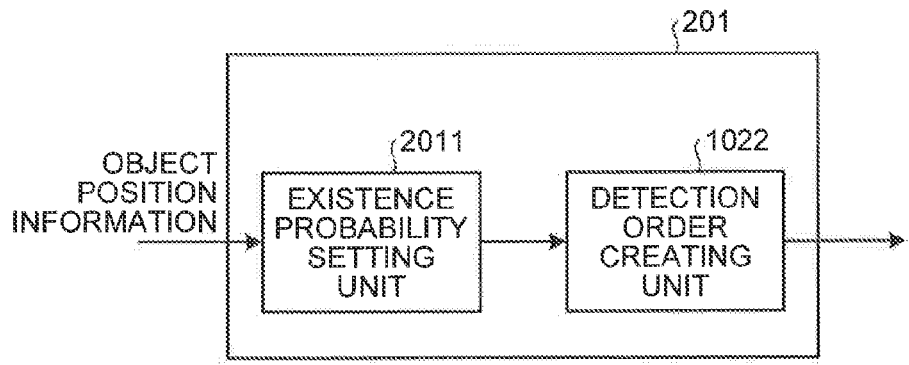
FIG. 20 is a block diagram illustrating a detailed functional configuration example of a first determining unit according to the second embodiment.

FIG. 20 is a block diagram illustrating a detailed functional configuration example of the first determining unit 201. As illustrated in FIG. 20, the first determining unit 201 includes an existence probability setting unit 2011 and the detection order creating unit 1022. Thus, as compared to the first determining unit 103 according to the first embodiment, the difference in the first determining unit 201 is the existence probability setting unit 2011. Hence, the explanation is given with the focus on the differences therebetween.

Once an object is detected as a result of a detection operation; the detecting unit 102 outputs object position information, which contains the position and the size of the object in the captured image, to the first determining unit 201 (to the existence probability setting unit 2011). Then, the existence probability setting unit 2011 updates the probability map data based on the object position information.

More particularly, the existence probability setting unit 2011 increases, in image data having the same size as the size of the captured image, the existence probability of the area specified in the object position information; and updates the probability map data. Moreover, in the second embodiment, the detection order creating unit 1022 repeats the detection order creating operation (i.e., the operation performed at Step S1002 illustrated in FIG. 6) at predetermined timings. Consequently, depending on the updating of the probability map data, the processing group corresponding to the area in which the object is detected also has an increased existence probability. At that time, the initial existence probabilities are set according to the probability model such as the normal distribution model described in the first embodiment. Alternatively, the initial existence probabilities can be set in uniform distribution.

The method of updating the existence probability is described in detail. The objective of updating is to increase the existence probability of the position at which an object was detected while using the device and to enhance the detection efficiency at the corresponding position of the camera 20. Herein, an existence probability ip(i) representing the integerized version of an existence probability p(i) can be obtained using Equation (14) given below.

$$ip(i) = \text{round}\left(\frac{p(i)}{\min_{i \in I} p(i)}\right) \quad (14)$$

With that, it becomes possible to obtain the existence probability ip(i) that is integerized to the smallest value of one. For example, if the object position information that is input indicates a vector d (that represents the area corresponding to a combination of a position x in the horizontal direction of the captured image, a position y in the vertical direction, and a size w of the search window); then the existence probability setting unit 2011 updates the existence probability ip(i) in the manner given in Expression (15) given below.

$$ip(d) \leftarrow ip(d) + U \quad (15)$$

In Expression (15), for example, assume that an integer U is equal to one. Alternatively, assuming that an error is included in the detected position; with respect to d=(xd, yd, wd), neighborhood D={Δ=(x, y, w)|xd−dx≤x≤xd+dx, yd−dy≤y≤yd+dy, wd−dw≤w≤wd+dw} is set, and the existence probability of the position of the vector Δ included in D can be updated using Expression 15 given above. Still alternatively, without limiting the updated value of the existence probability to the integer U, the updating can be performed according to Expression (16) given below.

$$ip(d) \leftarrow ip(d) + \exp\left\{\frac{|d - \Delta|}{2\sigma^2}\right\} \quad (16)$$

In Expression 16, "||" represents the norm of the vector. Then, the original existence probability is again obtained using Equation (17) given below.

$$p(i) = \frac{ip(i)}{\sum_{i \in I} ip(i)} \quad (17)$$

In this way, during the course of using the existence probabilities, they go on becoming more suitable to the position of the camera 20. That is desirable in the case of a stationary device such as a TV set. However, if the device is moved or if the device is a mobile device, that is, if the camera position is changed; then there are times when the updated existence probabilities are no more suitable. In that regard, when the power supply to the device is cut off, initialization is performed. Alternatively, the device can be equipped with a function that enables the user to directly initialize the existence probability.

In the explanation given above, the method of updating the existence probability p(i) is explained in the case when the existence probabilities are expressed in a three-dimensional manner. However, the abovementioned method of updating can also be implemented in updating an existence probability p(b) in the case when the existence probabilities are expressed in a one-dimensional manner or a two-dimensional manner.

Figure 21:
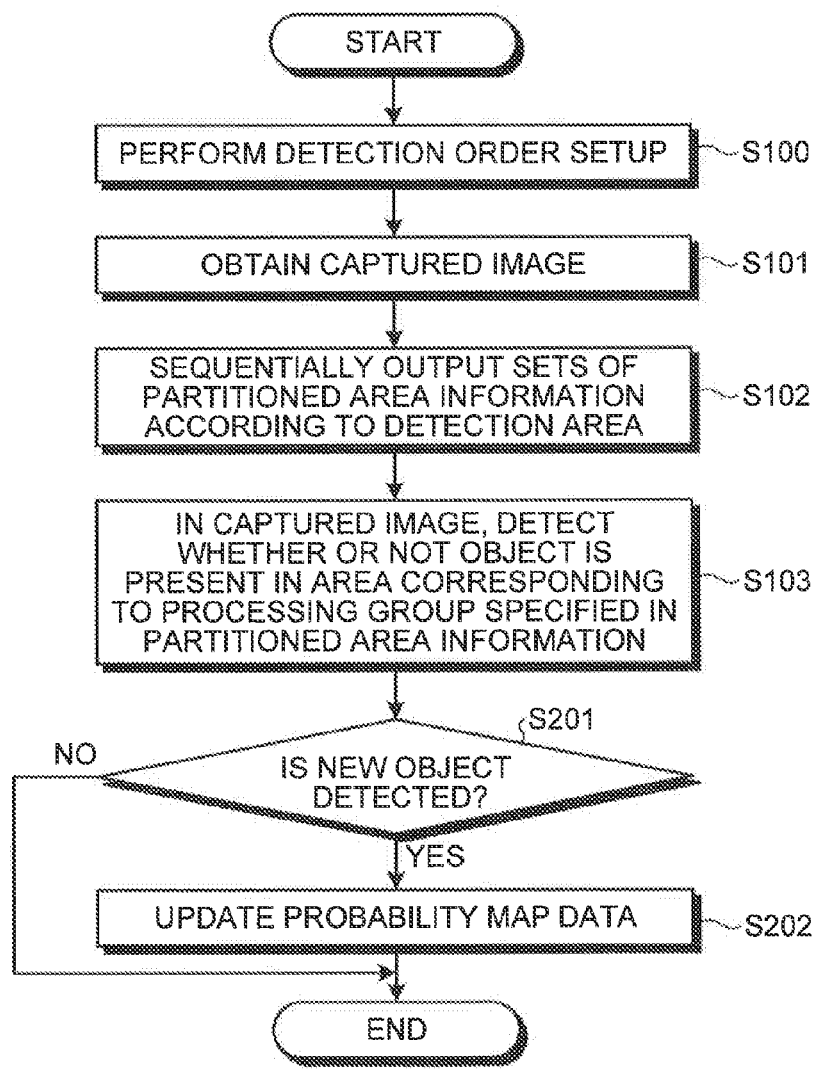
FIG. 21 is a flowchart for explaining an example of the operations performed by the image processing unit according to the second embodiment.

Explained below with reference to FIG. 21 are the operations performed by the image processing unit 300 according to the second embodiment. FIG. 21 is a flowchart for explaining an example of the operations performed by the image processing unit 300. In FIG. 21, the operations from Step S100 to Step S103 are identical to the operations from Step S100 to Step S103 illustrated in FIG. 18. Hence, those operations are not explained in detail again. After the operation at Step S103 is performed, if an object is detected as the result of performing a detection operation (Yes at Step S201), the detecting unit 102 outputs the object position information of the detected object to the existence probability setting unit 2011. Then, the existence probability setting unit 2011 updates the probability map data based on the object position information (Step S202).

As described above, according to the second embodiment, every time an object is detected as the result of a detection operation, the existence probabilities are updated. Hence, it becomes possible to create a schedule that is suitable for the usage status. Meanwhile, the timing of creating the schedule (i.e., the timing of preforming the operation at Step S1002) can be set in an arbitrary manner. That is, the schedule can be created every time an existence probability is updated. Alternatively, the schedule can be created only after the elapse of the total processing time $T_{all}$.

Third Embodiment

Given below is the explanation of a third embodiment. As compared to the embodiments described above, the third embodiment differs in the way that a tracking detection unit is additionally disposed that scans the search window, which is used to search for an object, with respect to only those areas in an input image which are in the neighborhood of the object which was detected during a detection operation; and detects whether or not the object is present. The detailed explanation thereof is given below. Meanwhile, regarding the portion that is identical to the embodiments described above, the explanation is not repeated.

Figure 22:
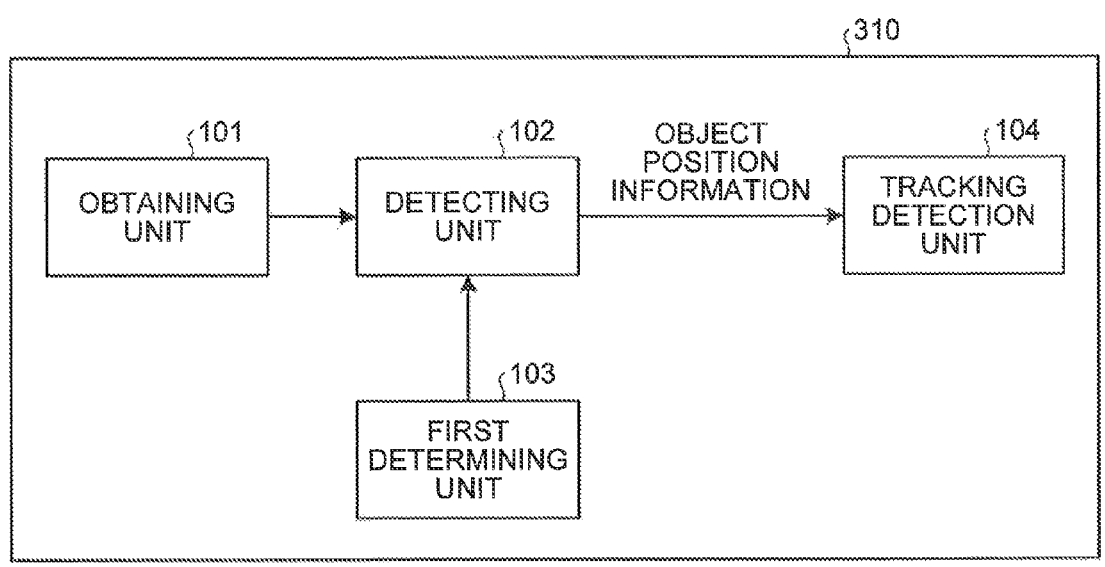
FIG. 22 is a block diagram illustrating a functional configuration example of an image processing unit according to a third embodiment.

FIG. 22 is a block diagram illustrating a functional configuration example of an image processing unit 310 according to the third embodiment. As compared to the embodiments described above, the only difference in the image processing unit 310 is a tracking detection unit 104. Hence, the explanation is given with the focus on the functions of the tracking detection unit 104. Herein, the tracking detection unit 104 obtains the object position information (x, y, w) from the detecting unit 102; scans the search window with respect to only the areas in the neighborhood of the object position information (the areas including the object position information); and detects whether or not an object is present (i.e., performs what is called a tracking operation).

Figure 23:
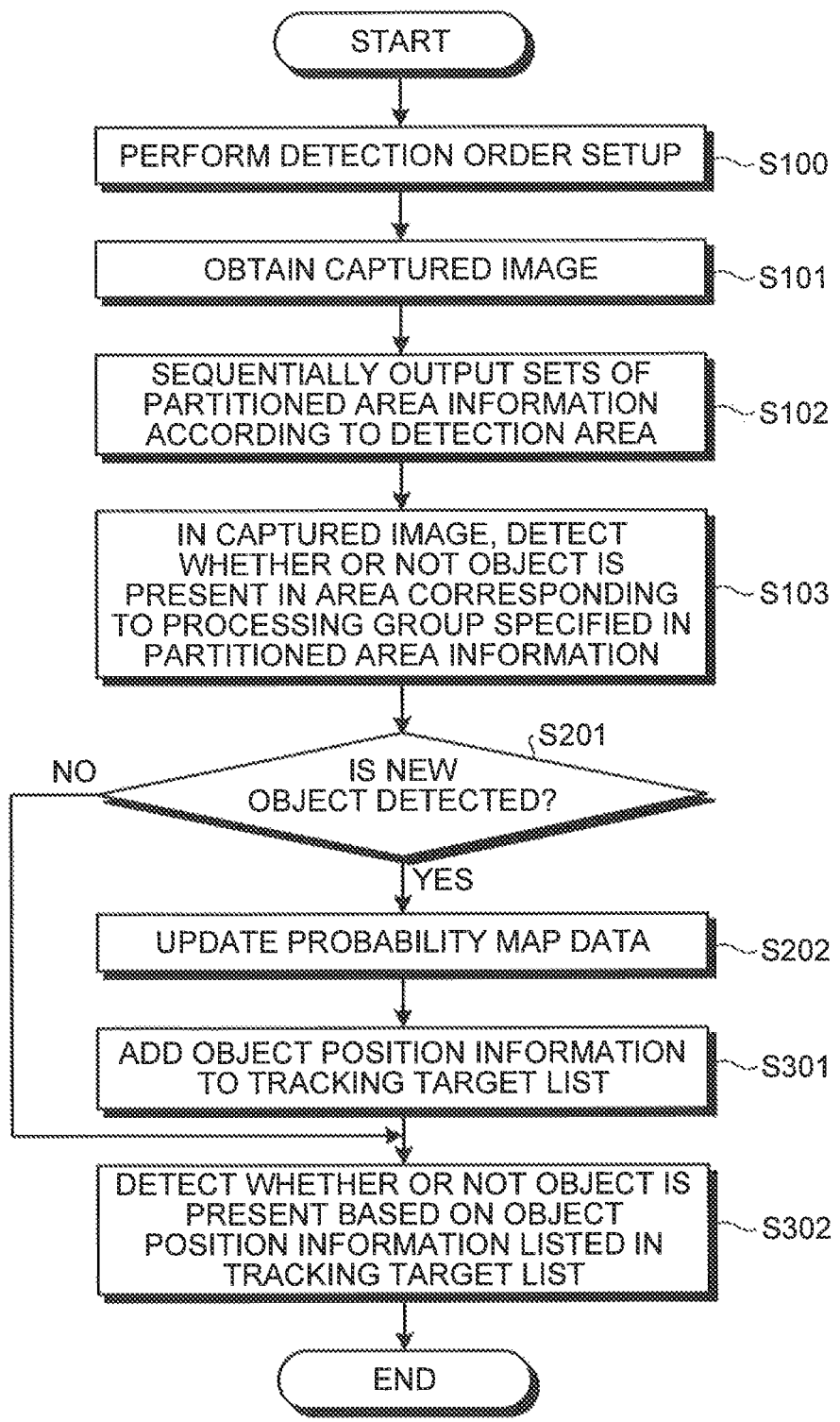
FIG. 23 is a flowchart for explaining an example of the operations performed by the image processing unit according to the third embodiment.

Explained below with reference to FIG. 23 are the operations performed by the image processing unit 310 according to the third embodiment. FIG. 23 is a flowchart for explaining an example of the operations performed by the image processing unit 310. In FIG. 23, the operations from Step S100 to Step S202 are identical to the operations from Step S100 to Step S202 illustrated in FIG. 21. Hence, those operations are not explained in detail again. However, alternatively, it is possible to omit the operation at Step S202 illustrated in FIG. 23 (i.e., to omit the updating of the existence probabilities). After the operation at Step S202 is performed, the tracking detection unit 104 obtains the object position information from the detecting unit 102 and adds it to a tracking target list (Step S301). At that time, if the object position information that has been obtained is close to the object position information (x, y, w) that is already present in the tracking target list, then the tracking detection unit 104 does not add the object position information that has been obtained in the tracking target list. Herein, consider a case when the object position information that has been obtained is close to the object position information that is already present in the tracking target list. In that case, if the position indicated by the object position information that is already present in the tracking target list is included within a circular range having twice the radius to the size of the detected object around the position indicated by the object position information that has been obtained; the objects indicated by the two sets of object position information are regarded to be the same object. Thus, the object position information that has been obtained is destroyed.

Subsequently, the tracking detection unit 104 performs a detection operation by scanning the search window with respect to only the area in the neighborhood of the position indicated by each set of object position information listed in the tracking target list and detecting whether or not an object is present (Step S302). That is done under the assumption that, once an object is detected, there is not much temporal change in the position of that object. Moreover, that is done with the aim of reducing the amount of processing involved in the object detection operation. Meanwhile, it is common practice to set the neighborhood using, for example, a particle filter.

As described above, in the third embodiment, those areas in the input image which are in the neighborhood of a detected object are set as target areas for object detection; and the object detection operation is repeated with respect to only the set areas. As a result, it becomes possible not only to reduce the amount of processing involved in the object detection operation but also to prevent a situation in which the sight of a detected object is lost. Moreover, in an identical manner to the embodiments described above, in the third embodiment too; a detection order is determined in such a way that, from among a plurality of processing groups obtained by dividing an input image, the processing groups having higher existence probabilities set in advance are subjected to a detection operation on priority. As a result, it becomes possible to reduce the expected waiting time till the object is detected. Thus, according to the third embodiment, it not only becomes possible to reduce the expected waiting time till the object is detected but also becomes possible to reduce the amount of processing involved in the object detection operation as well as to prevent a situation in which the sight of a detected object is lost.

Fourth Embodiment

Given below is the explanation of a fourth embodiment. As compared to the embodiments described above, the fourth embodiment differs in the way that an estimating unit is additionally disposed that estimates the three-dimensional position in the real space of an object based on object position information which indicates the position and the size of the object detected as the result of a detection operation. The detailed explanation is given below.

Meanwhile, regarding the portion that is identical to the embodiments described above, the explanation is not repeated.

Figure 24:
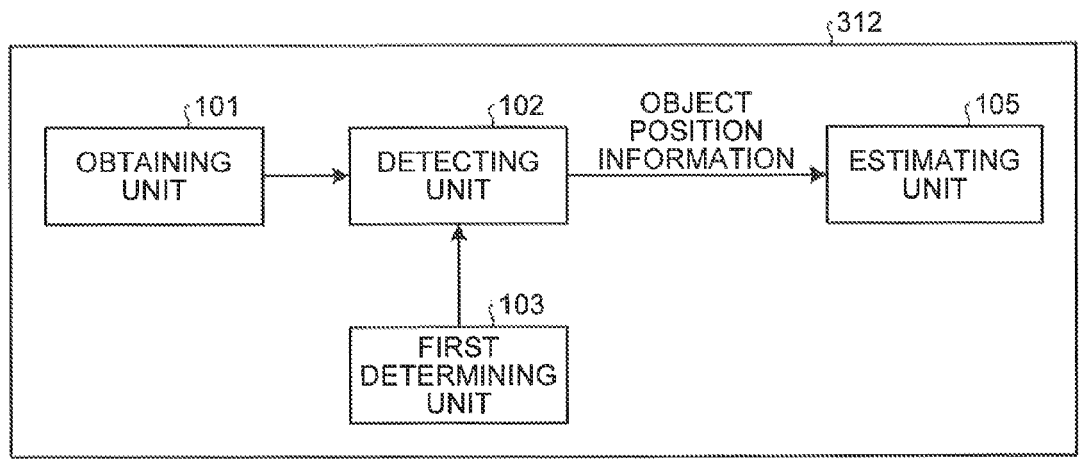
FIG. 24 is a block diagram illustrating a functional configuration example of an image processing unit according to a fourth embodiment.

FIG. 24 is a block diagram illustrating a functional configuration example of an image processing unit 312 according to the fourth embodiment. As compared to the embodiments described above, the only difference in the image processing unit 312 is an estimating unit 105. Hence, the explanation is given with the focus on the functions of the estimating unit 105. Moreover, the image processing unit 312 can also include the tracking detection unit 104 described above.

The estimating unit 105 obtains the object position information (x, y, w) from the detecting unit 102 and, based on the object position information, estimates the three-dimensional position (the three-dimensional coordinate value) of the object in the real space. At that time, although it is desirable that the actual size in the three-dimensional space of the object is known, it is also possible to use the average size. For example, statistical data indicates that the face of an adult person is 14 cm wide on an average. Meanwhile, the conversion of the object position information (x, y, w) into a three-dimensional position (X, Y, Z) is performed based on the pinhole camera model.

Figure 25:
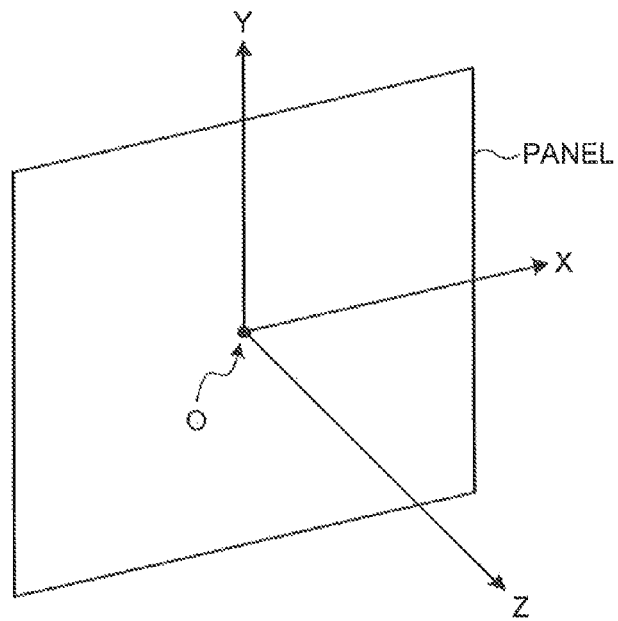
FIG. 25 is a schematic diagram illustrating a three-dimensional coordinate system according to the fourth embodiment.

Meanwhile, in this example, the three-dimensional coordinate system in the real space is defined in the following manner. FIG. 25 is a schematic diagram illustrating a three-dimensional coordinate system according to the fourth embodiment. As illustrated in FIG. 25, in the fourth embodiment, the center of a display surface of a panel is considered to be an origin O. Moreover, the X-axis is set in the horizontal direction of the display surface; the Y-axis is set in the vertical direction of the display surface; and the Z-axis is set in the normal direction of the display surface. However, that is not the only way of setting coordinates in the real space.

Figure 26:
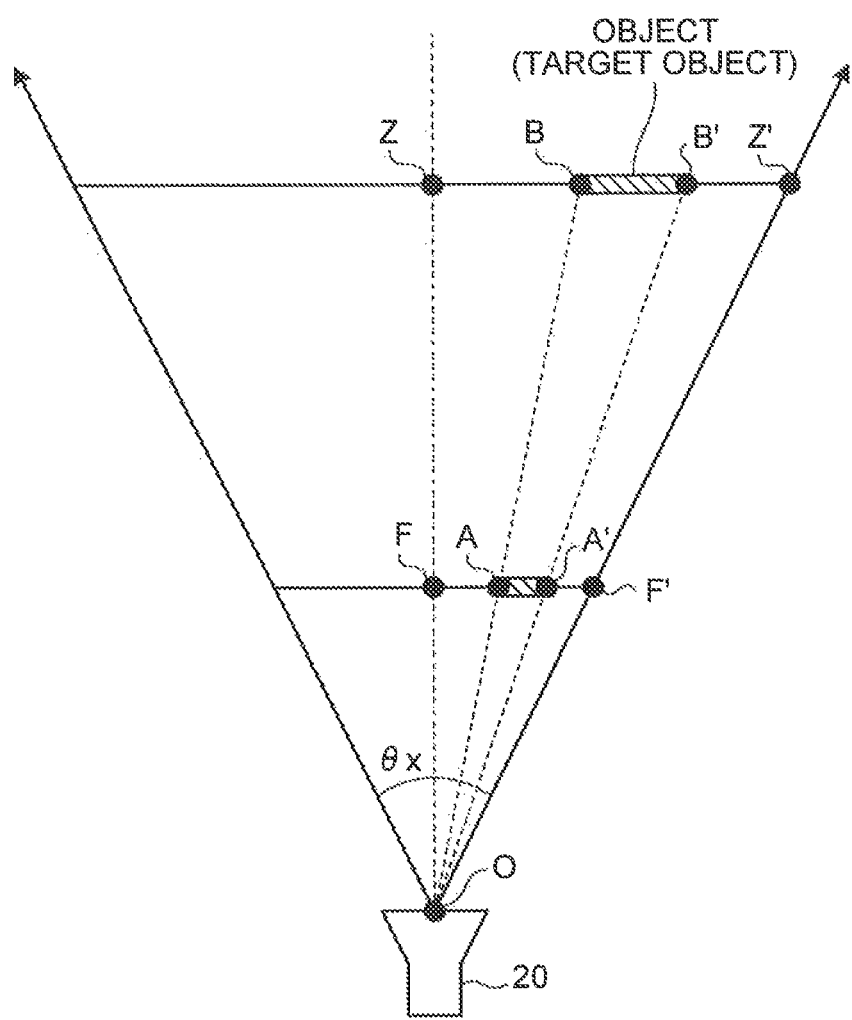
FIG. 26 is a diagram illustrating an example of a search window and illustrating the width of an object.

FIG. 26 is a diagram illustrating the search window of an object detected on the XZ plane and illustrating the width on the X-axis of the object in the real space. Herein, it is assumed that the image capturing unit 20 makes an angle θx in the X-axis direction; it is assumed that "F" represents the focal position in the Z-axis direction of the captured image that is obtained by the image capturing unit 20; and "Z" represents the position in the Z-axis direction of the object. Then, in FIG. 26, regarding AA', BB', OF, and OZ; the relationship of AA': BB'=OF:OZ is established according to the scaling relationship. Herein, AA' indicates the width in the X-axis direction of the search window in the captured image obtained by the image capturing unit 20. BB' indicates the actual width in the X-axis direction of the object. OF indicates the distance from the image capturing unit 20 to the focal position F. OZ indicates the distance from the image capturing unit 20 to the position Z of the object.

Herein, it is assumed that the distance FF' from the focal position to the end of the captured image is equal to wc/2, which is half of the horizontal resolution of the monocular camera (the image capturing unit 20). In that case, OF becomes equal to FF'/tan(θ$_x$/2).

Then, the width AA' in the X-axis direction of the search window in the captured image obtained by the image capturing unit 20 is set to be the pixel count in the x-axis direction of the search window. The actual width BB' in the X-axis direction of the object is assumed to be the average size of the object. For example, it is said that the face is 14 cm wide on an average.

Consequently, the estimating unit 105 obtains the distance OZ from the image capturing unit 20 to the object using Equation (18) given below.

$$OZ = \frac{BB' \times OF}{AA'} \quad (18)$$

That is, based on the width indicated by the pixel count of the search window in the captured image that is obtained by the image capturing unit 20, the estimating unit 105 can estimate the Z-coordinate of the three-dimensional position of the object. Moreover, in FIG. 26, regarding AF, BZ, OF, and OZ; the relationship of AF:BZ=OF:OZ is established according to the scaling relationship. Herein, AF indicates the distance to the focal position F from an end A in the X-axis direction of the search window in the captured image obtained by the image capturing unit 20. BZ indicates the distance from an end B in the X-axis direction of the object to the position Z in the Z-axis direction of the object.

For that reason, by obtaining BZ, the estimating unit 105 estimates the X-coordinate of the three-dimensional position of the object. Then, in an identical manner regarding the YZ plane too, the estimating unit 105 estimates the Y-coordinate of the three-dimensional position of the object.

Fifth Embodiment

Given below is the explanation of a fifth embodiment. As compared to the fourth embodiment, the fifth embodiment differs in the way that the three-dimensional position estimated by the estimating unit 105 is determined as the visible area to be displayed on the display unit 10 to enable the viewer to view a stereoscopic image; and the display unit 10 is controlled in such a way that the determined visible area is formed. The detailed explanation is given below. Meanwhile, regarding the portion that is identical to the embodiments described above, the explanation is not repeated.

Prior to the explanation of an image processing unit 314 according to the fifth embodiment, the explanation is given regarding the method of controlling the setting position or the setting range of the visible area. The position of the visible area is determined according to a combination of display parameters of the display unit 10. Examples of the display parameters include the shift in the display image, the distance (clearance gap) between the display element 11 and the light beam control element 12, the pitch of the pixels, the rotation of the display unit 10, the deformation of the display unit 10, and the movement of the display unit 10.

Figure 27:
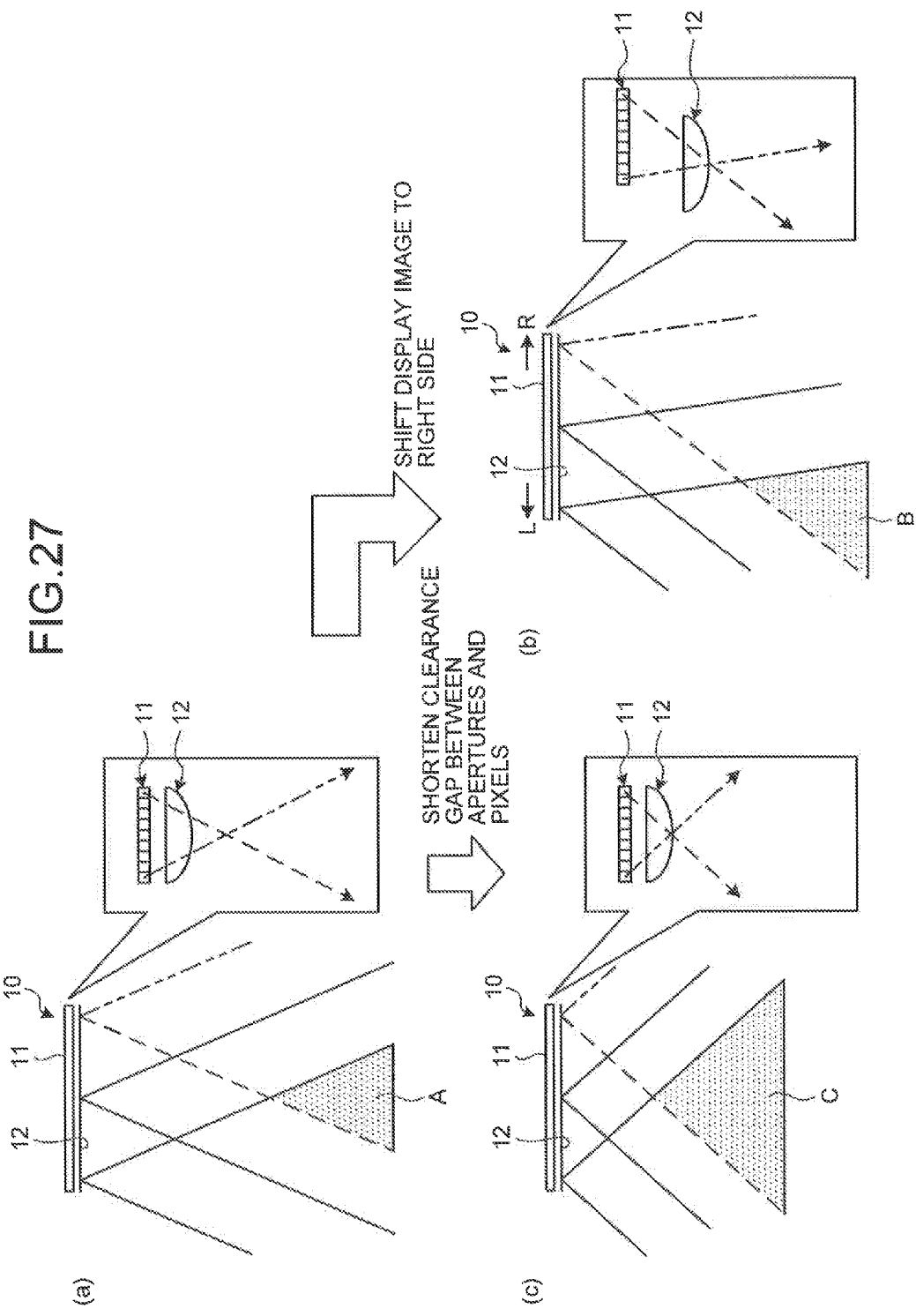
FIG. 27 to FIG. 29 are diagrams for explaining the controlling of a visible area according to a fifth embodiment.
Figure 28:
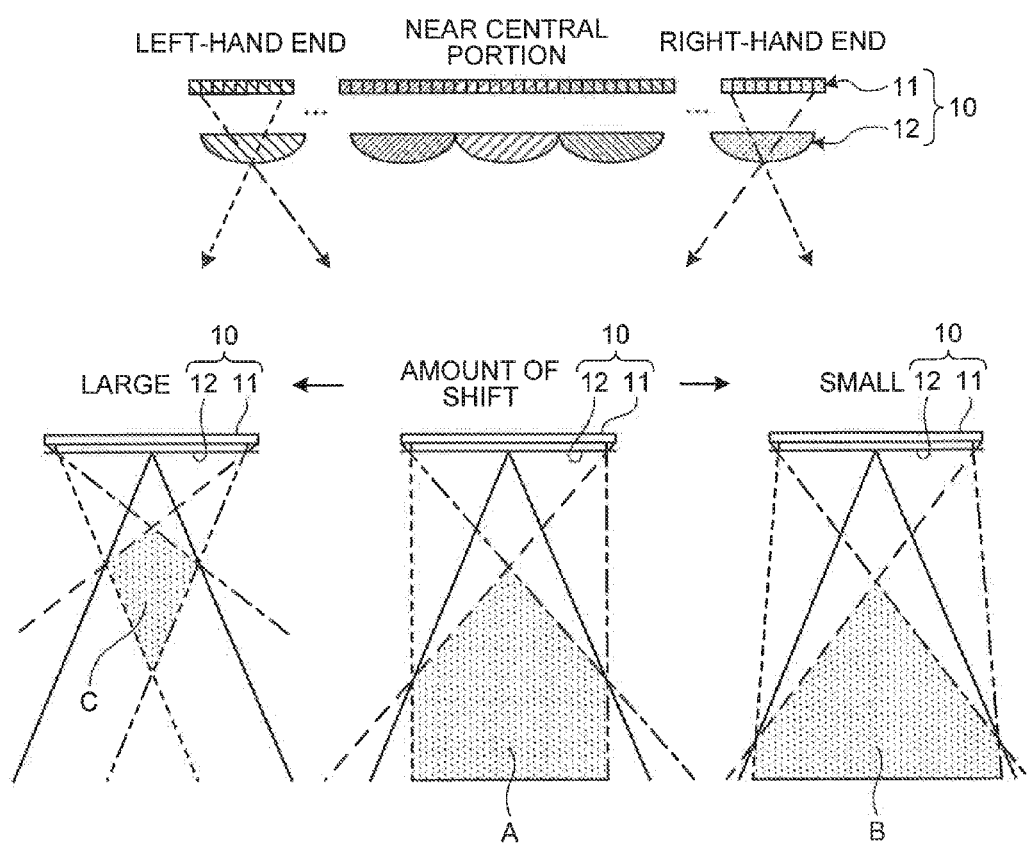
Figure 29:
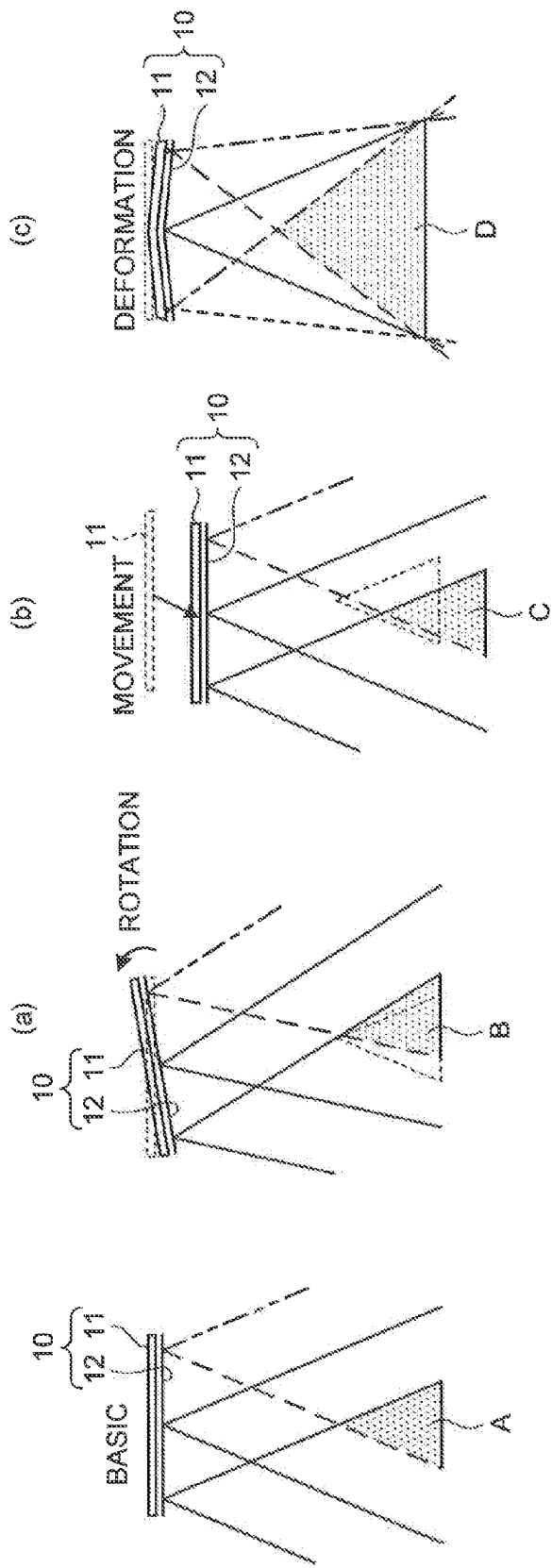

FIG. 27 to FIG. 29 are diagrams for explaining the controlling of the setting position or the setting range of the visible area. Firstly, explained with reference to FIG. 27 is a case in which the shift in the display image or the distance (clearance gap) between the display element 11 and the light beam control element 12 is adjusted to control the position of setting the visible area. With reference to FIG. 27, if the display image is shifted to, for example, the right-hand direction (in (b) in FIG. 27, see the direction of an arrow R); the light beam tilts in the left-hand direction (in (b) in FIG. 27, see the direction of an arrow L). As a result, the visible area moves in the left-hand direction (in (b) in FIG. 27, see a visible area B). In contrast, if the display image is moved to the left-hand direction as compared to (a) in FIG. 27; the visible area moves in the right-hand direction (not illustrated).

Moreover, as illustrated in (a) and (c) in FIG. 27, shorter the distance between the display element 11 and the light beam control element 12, the closer is the position to the display unit 10 at which the visible area can be set. Moreover, closer the position to the display unit 10 at which the visible area is set, the lower becomes the light beam density. On the other hand, longer the distance between the display element 11 and the light beam control element 12, the farther is the position from the display unit 10 at which the visible area can be set.

Explained below with reference to FIG. 28 is a case in which the arrangement (pitch) of the pixels displayed on the display element 11 is adjusted to control the position of setting the visible area. Herein, the visible area can be controlled by making use of the fact that, closer to the right-hand end and the left-hand end of the screen of the display element 11, the relatively larger is the misalignment between the positions of the pixels and the position of the light beam control element 12. If the amount of relative misalignment between the positions of the pixels and the position of the light beam control element 12 is increased, then the visible area changes from a visible area A illustrated in FIG. 28 to a visible area C illustrated in FIG. 28. In contrast, if the amount of relative misalignment between the positions of the pixels and the position of the light beam control element 12 is reduced, then the visible area changes from the visible area A illustrated in FIG. 28 to a visible area B illustrated in FIG. 28. Meanwhile, the maximum width of the visible area (i.e., the maximum length in the horizontal direction of the visible area) is called a visible area setting distance.

Explained below with reference to FIG. 29 is a case in which the position of setting the visible area is controlled by means of the rotation of the display unit 10, the deformation of the display unit 10, and the movement of the display unit 10. As illustrated in (a) in FIG. 29, if the display unit 10 is rotated, then a visible area A in the basic state can be changed to a visible area B. As illustrated in (b) in FIG. 29, if the display unit 10 is moved, then the visible area A in the basic state can be changed to a visible area C. As illustrated in (c) in FIG. 29, if the display unit 10 is subjected to deformation, then the visible area A in the basic state can be changed to a visible area D. In this way, the position of the visible area is determined according to a combination of display parameters of the display unit 10.

Figure 30:
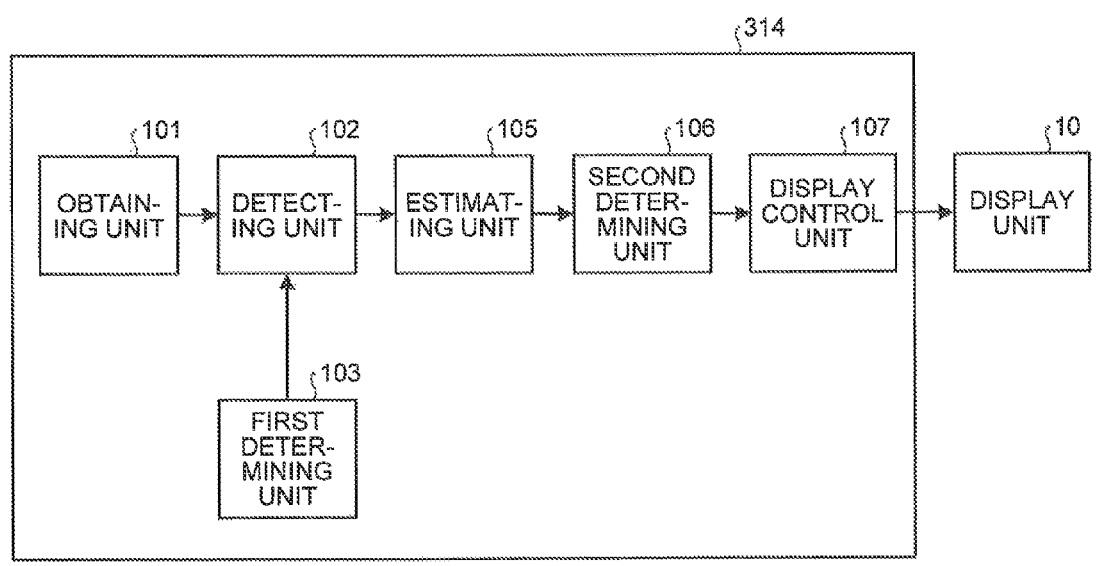
FIG. 30 is a block diagram illustrating a functional configuration example of an image processing unit according to the fifth embodiment.

FIG. 30 is a block diagram illustrating a functional configuration example of the image processing unit 314 according to the fifth embodiment. As compared to the fourth embodiment, the difference in the image processing unit 314 is a second determining unit 106 and a display control unit 107. Hence, the explanation is given with the focus on the differences therebetween. Meanwhile, the image processing unit 314 can also include the tracking detection unit 104 described above.

The second determining unit 106 determines the visible area in such a way that the three-dimensional position estimated by the estimating unit 105 is included in the visible area. More particularly, the second determining unit 106 calculates visible area information that indicates the visible area within which a stereoscopic image can be viewed at the three-dimensional position estimated by the estimating unit 105. As far as the calculation of visible area information is concerned; for example, visible area information indicating the visible areas corresponding to the combinations of display parameters is stored in advance in a memory (not illustrated). Then, the second determining unit 106 performs visible area information calculation by searching the memory for the visible area information that contains the three-dimensional position estimated by the estimating unit 105.

However, that is not the only possible case, and the second determining unit 106 can determine the visible area by implementing any arbitrary method. For example, the second determining unit 106 can perform computing to determine the position of the visible area that includes the three-dimensional position estimated by the estimating unit 105. In that case, for example, the three-dimensional coordinate values and computing equations, which are used to obtain combinations of display parameters for determining the position of the visible area that includes the three-dimensional coordinate values, are stored in a corresponding manner in a memory (not illustrated). Then, the second determining unit 106 can read from the memory the computing equation corresponding to the three-dimensional position (the three-dimensional coordinate values) estimated by the estimating unit 105; obtain the combination of display parameters using that computing equation; and determine the position of the visible area that includes the three-dimensional coordinate values.

The display control unit 107 performs display control in which the display unit 10 is controlled in such a way that the visible area is formed at the position determined by the second determining unit 106. More particularly, the display control unit 107 controls the combination of display parameters of the display unit 10. With that, on the display unit 10 is displayed a stereoscopic image in which the area including the three-dimensional position of the object estimated by the estimating unit 105 serves as the visible area.

As described above, according to the fifth embodiment, it is not necessary for the viewer to change the position so as to be present within the visible area. That enables achieving enhancement in the user-friendliness for the viewer. Moreover, in an identical manner to the embodiments described above, in the fifth embodiment too; a detection order is determined in such a way that, from among a plurality of processing groups obtained by dividing an input image, the processing groups having higher existence probabilities set in advance are subjected to a detection operation on priority. As a result, it becomes possible to reduce the expected waiting time till the object is detected. Thus, according to the fifth embodiment, it not only becomes possible to reduce the expected waiting time till the object is detected but also becomes possible to enhance the user-friendliness for the viewer.

For example, in the embodiments described above, the light beam control element 12 is disposed in such a way that the extending direction of the optical apertures 13 has a predetermined tilt with respect to a second direction (the column direction) of the display element 11. Herein, it is possible to change the degree of tilt in an arbitrary manner. Alternatively, for example, the configuration can be such that the light beam control element 12 is disposed in such a way that the extending direction of the optical apertures 13 is consistent with the second direction (the column direction) of the display element 11 (i.e., the configuration of a vertical lens).

Meanwhile, the image processing unit according to each embodiment described above (i.e., the image processing unit 30, the image processing unit 300, the image processing unit 310, the image processing unit 312, and the image processing unit 314) has the hardware configuration that includes a central processing unit (CPU), a read only memory (ROM), a random access memory (RAM), and a communication I/F device. Herein, the functions of each of the above-mentioned constituent elements (the obtaining unit 101, the detecting unit 102, the first determining unit 103, the tracking detection unit 104, the estimating unit 105, and the second determining unit 106) is implemented when the CPU loads computer programs, which are stored in the ROM, in the RAM and executes those computer programs. However, that is not the only possible case. Alternatively, at least some of the functions of the constituent elements can be implemented using dedicated hardware circuits.

Meanwhile, the computer programs executed in the image processing unit according to each embodiment described above (i.e., the image processing unit 30, the image processing unit 300, the image processing unit 310, the image processing unit 312, and the image processing unit 314) can be saved as downloadable files on a computer connected to the Internet or can be made available for distribution through a network such as the Internet and provided as a computer program product. Alternatively, the computer programs executed in the image processing unit according to each embodiment described above (i.e., the image processing unit 30, the image processing unit 300, the image processing unit 310, the image processing unit 312, and the image processing unit 314) can be stored in advance in a nonvolatile memory medium such as a ROM and provided as a computer program product.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
    an obtaining unit configured to obtain an input image;
    a first determining unit configured to determine a detection order that indicates an order of performing a detection operation for detecting whether an object is present with respect to partitioned areas into which the input image is divided, according to an existence probability that is set in advance for each of the partitioned areas and indicates a probability at which an object exists; and a detecting unit configured to perform, according to the detection order, the detection operation to detect whether the object is present in an area corresponding to a partitioned area subjected to the detection order in the input image, wherein
    the first determining unit determines the detection order so that, in a predetermined period of time, each of the partitioned areas is subjected to the detection operation at least once.

2. The device according to claim 1, wherein the first determining unit determines the detection order so that a higher priority is given to the detection operation with respect to a partitioned area having a higher existence probability.

3. The device according to claim 1, wherein the first determining unit increases the existence probability of a partitioned area that corresponds to an area in the input image in which the object has been detected as a result of the detection operation.

4. The device according to claim 1, further comprising a tracking detection unit configured to detect whether the object is present by scanning a search window that is used to search for the object, with respect to only such areas in the input image that are near the object that has been detected as a result of the detection operation.

5. The device according to claim 1, further comprising an estimating unit configured to estimate a three-dimensional position of the object in a real space based on object position information that indicates a position and a size of the object that has been detected as a result of the detection operation, in the input image.

6. The device according to claim 5, further comprising:
    a second determining unit configured to determine a visible area that allows a viewer to view a stereoscopic image so that the three-dimensional position estimated by the estimating unit is included in the visible area; and
    a display control unit configured to control a display unit that displays the stereoscopic image so that the visible area determined by the second determining unit is formed.

7. An image processing method comprising:
    obtaining an input image;
    determining a detection order that indicates an order of performing a detection operation for detecting whether an object is present with respect to partitioned areas into which the input image is divided, according to an existence probability that is set in advance for each of the partitioned areas and indicates a probability at which an object exists; and
    performing, according to the detection order, the detection operation to detect whether the object is present in an area corresponding to a partitioned area subjected to the detection order in the input image, wherein
    the determining determines the detection order so that, in a predetermined period of time, each of the partitioned areas is subjected to the detection operation at least once.

8. A computer program product comprising a computer-readable medium containing a program executed by a computer, the program causing the computer to execute:
    obtaining an input image;
    determining a detection order that indicates an order of performing a detection operation for detecting whether an object is present with respect to partitioned areas into which the input image is divided, according to an existence probability that is set in advance for each of the partitioned areas and indicates a probability at which an object exists; and
    performing, according to the detection order, the detection operation to detect whether the object is present in an area corresponding to a partitioned area subjected to the detection order in the input image, wherein
    the determining determines the detection order so that, in a predetermined period of time, each of the partitioned areas is subjected to the detection operation at least once.

9. An image display device comprising:
    a display unit configured to display a stereoscopic image including a plurality of parallax images;
    an obtaining unit configured to obtain an input image;
    a first determining unit configured to determine a detection order that indicates an order of performing a detection operation for detecting whether an object is present with respect to partitioned areas into which the input image is divided, according to an existence probability that is set in advance for each of the partitioned areas and indicates a probability at which an object exists;
    a detecting unit configured to perform, according to the detection order, the detection operation to detect whether the object is present in an area corresponding to a partitioned area subjected to the detection order in the input image;

an estimating unit configured to estimate a three-dimensional position of the object in a real space based on object position information that indicates a position and a size of the object that has been detected as a result of the detection operation, in the input image;

a visible area determining unit configured to determine a visible area that allows a viewer to view the stereoscopic image so that the three-dimensional position estimated by the estimating unit is included in the visible area; and a display control unit configured to control the display unit so that the visible area determined by the visible area determining unit is formed, wherein the first determining unit determines the detection order so that, in a predetermined period of time, each of the partitioned areas is subjected to the detection operation at least once.

* * * * *